United States Patent
Patel et al.

(10) Patent No.: US 10,983,194 B1
(45) Date of Patent: Apr. 20, 2021

(54) METASURFACES FOR IMPROVING CO-SITE ISOLATION FOR ELECTRONIC WARFARE APPLICATIONS

(71) Applicant: HRL Laboratories, LLC, Malibu, CA (US)

(72) Inventors: Amit M. Patel, Santa Monica, CA (US); Adour V. Kabakian, Monterey Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 331 days.

(21) Appl. No.: 15/986,741

(22) Filed: May 22, 2018

Related U.S. Application Data

(63) Continuation-in-part of application No. 14/737,100, filed on Jun. 11, 2015, now abandoned.

(60) Provisional application No. 62/011,447, filed on Jun. 12, 2014.

(51) Int. Cl.
*G01S 7/36* (2006.01)
*H01Q 17/00* (2006.01)

(52) U.S. Cl.
CPC .............. *G01S 7/36* (2013.01); *H01Q 17/002* (2013.01)

(58) Field of Classification Search
CPC .............. H01Q 15/008; H01Q 15/0086; H01Q 15/0066; H01Q 17/00; H01Q 17/002; H01Q 17/008; H01P 7/00; H01P 7/10; H01P 1/2005; G01S 7/02; G01S 7/36; G05B 2219/39339; G01N 2291/018
USPC ..................................................... 342/13, 16
See application file for complete search history.

(56) References Cited

U.S. PATENT DOCUMENTS

| | | |
|---|---|---|
| 3,771,077 A | 11/1973 | Tischer |
| 4,378,558 A | 3/1983 | Luden |
| 4,507,664 A | 3/1985 | James et al. |
| 4,716,417 A | 12/1987 | Grumet |
| 5,086,301 A | 2/1992 | English et al. |
| 5,486,837 A | 1/1996 | Miller |
| 5,638,079 A | 6/1997 | Kastner et al. |
| 5,917,458 A | 6/1999 | Ho et al. |
| 6,208,316 B1 | 3/2001 | Cahill |
| 6,262,495 B1 | 7/2001 | Yablonovitch et al. |
| 6,323,826 B1 | 11/2001 | Sievenpiper et al. |
| 6,346,761 B1 | 2/2002 | Isobe et al. |
| 6,483,481 B1 | 11/2002 | Sievenpiper et al. |
| 6,496,155 B1 | 12/2002 | Sievenpiper et al. |

(Continued)

FOREIGN PATENT DOCUMENTS

| | | |
|---|---|---|
| EP | 1 508 940 A1 | 2/2005 |
| EP | 2 822 096 A1 | 1/2015 |
| JP | 2002/299951 | 10/2002 |
| WO | 96/09662 | 3/1996 |
| WO | 2004/093244 | 10/2004 |

OTHER PUBLICATIONS

U.S. Appl. No. 14/737,100, filed Jun. 11, 2015, Patel et al.

(Continued)

*Primary Examiner* — Erin F Heard
*Assistant Examiner* — Michael W Justice
(74) *Attorney, Agent, or Firm* — Ladas & Parry

(57) ABSTRACT

A method for providing control of surface waves propagating on a surface includes forming a surface treatment on the surface, wherein the surface treatment is configured to achieve a tensor surface admittance distribution matrix on the surface determined according to a modified transformation electromagnetics (tEM) equation.

30 Claims, 17 Drawing Sheets

(56) References Cited

U.S. PATENT DOCUMENTS

| | | |
|---|---|---|
| 6,512,494 B1 | 1/2003 | Diaz et al. |
| 6,518,931 B1 | 2/2003 | Sievenpiper |
| 6,538,621 B1 | 3/2003 | Sievenpiper et al. |
| 6,552,696 B1 | 4/2003 | Sievenpiper et al. |
| 6,624,781 B1 | 9/2003 | Collins |
| 6,628,242 B1 | 9/2003 | Hacker et al. |
| 6,657,592 B2 | 12/2003 | Dening et al. |
| 6,690,327 B2 | 2/2004 | McKinzie, III et al. |
| 6,739,028 B2 | 5/2004 | Sievenpiper et al. |
| 6,768,476 B2 | 7/2004 | Lilly et al. |
| 6,774,866 B2 | 8/2004 | McKinzie, III et al. |
| 6,806,846 B1 | 10/2004 | West |
| 6,897,831 B2 | 5/2005 | McKinzie, III et al. |
| 6,917,343 B2 | 7/2005 | Sanchez et al. |
| 7,071,888 B2 | 7/2006 | Sievenpiper |
| 7,136,029 B2 | 11/2006 | Ramprasad et al. |
| 7,151,506 B2 | 12/2006 | Knowles et al. |
| 7,197,800 B2 | 4/2007 | Sievenpiper et al. |
| 7,215,007 B2 | 5/2007 | McKinzie, III et al. |
| 7,215,301 B2 | 5/2007 | Choi et al. |
| 7,218,281 B2 | 5/2007 | Sievenpiper et al. |
| 7,245,269 B2 | 7/2007 | Sievenpiper et al. |
| 7,268,650 B2 | 9/2007 | Higgins |
| 7,411,565 B2 | 8/2008 | McKinzie, III et al. |
| 7,420,524 B2 | 9/2008 | Werner et al. |
| 7,471,247 B2 | 12/2008 | Saily et al. |
| 7,830,310 B1 | 11/2010 | Sievenpiper et al. |
| 7,911,407 B1 * | 3/2011 | Fong .................. H01Q 15/0046 343/909 |
| 8,803,638 B2 | 8/2014 | Kildal |
| 8,847,846 B1 | 9/2014 | Diaz |
| 8,994,609 B2 | 3/2015 | Gregoire |
| 9,246,204 B1 | 1/2016 | Kabakian |
| 2003/0112186 A1 | 6/2003 | Sanchez et al. |
| 2003/0222733 A1 | 12/2003 | Ergene et al. |
| 2004/0201526 A1 | 10/2004 | Knowles et al. |
| 2005/0029632 A1 * | 2/2005 | McKinzie, III ....... H01P 1/2005 257/665 |
| 2005/0040918 A1 | 2/2005 | Kildal |
| 2005/0083228 A1 | 4/2005 | Edvardsson |
| 2006/0050010 A1 | 3/2006 | Choi et al. |
| 2006/0097942 A1 | 5/2006 | Tanaka et al. |
| 2006/0152430 A1 | 7/2006 | Seddon et al. |
| 2007/0147723 A1 | 6/2007 | Yamada |
| 2010/0027130 A1 | 2/2010 | Bowers et al. |
| 2010/0110559 A1 | 5/2010 | Cai et al. |
| 2010/0171066 A1 | 7/2010 | Ohkoshi et al. |
| 2010/0207830 A1 | 8/2010 | Parsche |
| 2010/0263199 A1 | 10/2010 | Morton et al. |
| 2010/0271253 A1 | 10/2010 | Shah et al. |
| 2011/0181373 A1 | 7/2011 | Kildal |
| 2011/0209110 A1 * | 8/2011 | Grbic .................. H01Q 15/0053 716/110 |
| 2012/0038532 A1 | 2/2012 | Yonetsu et al. |
| 2012/0194399 A1 | 8/2012 | Bily et al. |
| 2012/0206310 A1 | 8/2012 | Apostolos et al. |
| 2013/0214982 A1 | 8/2013 | Dean et al. |
| 2013/0285871 A1 | 10/2013 | Gregoire |
| 2015/0009071 A1 | 1/2015 | Gregoire |
| 2015/0222022 A1 | 8/2015 | Kundtz et al. |
| 2015/0372390 A1 | 12/2015 | Gregoire |
| 2016/0329639 A1 | 11/2016 | Kasahara |
| 2017/0141477 A1 * | 5/2017 | Kim .................. H01Q 15/0066 |

OTHER PUBLICATIONS

U.S. Appl. No. 15/344,363, filed Nov. 5, 2016, Patel.
"Hybrid (3 dB) Couplers," Microwaves101: Microwave Encyclopedia. P-N Designs, Inc. and IEEE. May 7, 2013. Web. Retrieved Jun. 10, 2014. <http://www.microwaves101.com/encyclopedia/hybridcouplers.cfm>.
Bilow, Henry J., "Guided Waves on a Planar Tensor Impedance Surface," *IEEE Transactions on Antennas and Propagation*, vol. 51, No. 10, pp. 2788-2792, (Oct. 2003).
Canino et al., "Numerical Solution of the Helmholtz Equation in 2D and 3D Using a High-Order Nystrom Discretization," *Journal of Computational Physics*, vol. 146, pp. 627-663, (1998).
Checcacci et al., "Holographic Antennas," *IEEE Transactions on Antennas and Propagation*, vol. 18, No. 6, pp. 811-813, (Nov. 1970).
Contopanagos et al., Well-Conditioned Boundary Integral Equations for Three-Dimensional Electromagnetic Scattering, *IEEE Transactions on Antennas and Propagation*, vol. 50, No. 12, pp. 1824-1830, (Dec. 2002).
Dong et al.: "Substrate Integrated Composite Right-/ Left-Handed Leaky-Wave Structure for Polarization-Flexible Antenna Application", IEEE Transactions on Antennas and Propagation, vol. 60, No. 2, Feb. 1, 2012, pp. 760-771.
ElSherbiny et al., "Holographic Antenna Concept, Analysis, and Parameters," *IEEE Transactions on Antennas and Propagation*, vol. 52, No. 3, pp. 830-839 (Mar. 2004).
Fathy et al., "Silicon-Based Reconfigurable Antennas—Concepts, Analysis, Implementation, and Feasibility," *IEEE Transactions on Microwave Theory and Techniques*, vol. 51, No. 6, pp. 1650-1661, (Jun. 2003).
Fong et al., "Scalar and Tensor Holographic Artificial Impedance Surfaces," *IEEE Transactions on Antennas and Propagation*, vol. 58, No. 10, pp. 3212-3221, (Oct. 2010).
Gregoire et al., "Artificial Impedance Surface Antenna Design and Simulation," *Proc. Antennas Appl. Symposium*, pp. 288-303, (2010).
Gregoire et al., "Artificial Impedance Surface Antennas," *Proc. Antennas Appl. Symposium*, pp. 460-475, (2011).
Gregoire, Daniel J. and Kabakian, Adour V., "Surface-Wave Waveguides," *IEEE Antennas and Wireless Propagation Letters*, vol. 10, pp. 1512-1515, (2011).
Kabakian, Adour, "Tensor Impedance Surfaces," AFOSR Final Report, (Nov. 30, 2010). http://www.dtic.mil/cgi-bin/GetTRDoc?AD=ADA566251.
King et al., "The Synthesis of Surface Reactance Using an Artificial Dielectric," *IEEE Transactions on Antennas and Propagation*, vol. 31, No. 3, pp. 471-476, (May 1993).
Levis et al., "Ka-Band Dipole Holographic Antennas," *IEEE Proceedings of Microwaves, Antennas and Propagation*, vol. 148, No. 2, pp. 129-132, (Apr. 2001).
Luukkonen et al., "Simple and Accurate Analytical Model of Planar Grids and High-Impedance Surfaces Comprising Metal Strips or Patches," *IEEE Transactions on Antennas and Propagation*, vol. 56, No. 6, pp. 1624-1632, (Jun. 2008).
Mitra et al., "Techniques for Analyzing Frequency Selective Surfaces—A Review," *Proceedings of the IEEE*, vol. 76, No. 12, pp. 1593-1615, (Dec. 1988).
Oliner et al., "Guided Waves on Sinusoidally-Modulated Reactance Surfaces," *IRE Transactions on Antennas and Propagation*, vol. 7, No. 5, pp. S201-S208, (Dec. 1959).
Patel, A. M. and Grbic, A., "A Printed Leaky-Wave Antenna Based on a Sinusoidally-Modulated Reactance Surface," *IEEE Transactions on Antennas and Propagation*, vol. 59, No. 6, pp. 2087-2096, (Jun. 2011).
Patel, A. M., and Grbic, A., "Effective Surface Impedance of a Printed-Circuit Tensor Impedance Surface," *IEEE Transactions on Microwave Theory and Techniques*, vol. 61, No. 4, pp. 1403-1413, (Apr. 2013).
Patel, A. M., and Grbic, A., "Modeling and Analysis of Printed-Circuit Tensor Impedance Surface," *IEEE Transactions on Antennas and Propagation*, vol. 61, No. 1, pp. 211-220, (Jan. 2013).
Patel, A. M., and Grbic, A., "The Effects of Spatial Dispersion on Power Flow Along a Printed-Circuit Tensor Impedance Surface," *IEEE Transactions on Antennas and Propagation*, vol. 62, No. 3, (Mar. 2014).
Patel, A. M., and Grbic, A., "Transformation Electromagnetics Devices Using Tensor Impedance Surfaces," *IEEE International Microwave Symposium*, (2013).
Patel: "Controlling Electromagnetic Surface Waves with Scalar and Tensor Impedance Surfaces", Jan. 1, 2013, <https :/l d eepb l ue.l i b. u m ic h .ed u/b itstrea mj hand le/202 7.42/9 79 54/am itm p 1. pdf?s eq u ence=1&isAllowed=y> (retrieved on Dec. 20, 2017); pp. 1-180.

(56) References Cited

OTHER PUBLICATIONS

Pease, Robert L., "Radiation From Modulated Surface-Wave Structures—II," *IRE International Convention Record*, vol. 5, pp. 161-165, (Mar. 1957).
Pendry, J. B. et al., "Controlling Electromagnetic Fields," *Science*, vol. 312, No. 5781, pp. 1780-1782, (Jun. 23, 2006).
Sazonov, Dimitry M., "Computer Aided Design of Holographic Antennas," *IEEE International Symposium of the Antennas and the Propagation Society*, vol. 2, pp. 738-741, (Jul. 1999).
Sievenpiper et al., "High-Impedance Electromagnetic Surfaces with a Forbidden Frequency Band," *IEEE Transactions on Microwave Theory and Techniques*, vol. 47, No. 11, pp. 2059-2074, (Nov. 1999).
Sievenpiper et al., "Holographic Artificial Impedance Surfaces for Conformal Antennas," *IEEE Antennas and Prop. Symp. Digest*, vol. 1B, pp. 256-259, (2005).
Thomas et al., "Radiation From Modulated Surface Wave Structures—I," *IRE International Convention Record*, vol. 5, pp. 153-160, (Mar. 1957).
Visher et al., "Polarization Controlling Holographic Artificial Impedance Surfaces," *IEEE AP-S*, 2007.
Young et al., "Meander-Line Polarizer," IEEE Transactions on Antennas and Propagation, pp. 376-378, (May 1973}.
From EPO Application No. 15810252.5, Supplementary European Search Report and Search Opinion dated Jan. 8, 2018.
From Japanese Application No. 2008/519484 Final Office Action, Decision of Refusal dated Oct. 11, 2011 with English Translation.
From PCT Application No. PCT/US2006/024979, Chapter I, International Preliminary Report on Patentability (IPRP) dated Jan. 9, 2008.
From PCT Application No. PCT/US2006/024979, International Search Report and Written Opinion (ISR & WO) dated Nov. 21, 2006.
From PCT Application No. PCT/US2006/024980, International Preliminary Report on Patentability (IPRP) dated Jul. 2, 2008.
From PCT Application No. PCT/US2006/024980, International Search Report and Written Opinion (ISR & WO) dated Nov. 29, 2006.
From PCT Application No. PCT/US2015/036104, International Search Report and Written Opinion (ISR & WO) dated Sep. 22, 2015.
From PCT Application No. PCT/US2015/036104, Chapter II International Preliminary Report on Patentability (IPRP) dated Jun. 16, 2016.
From Taiwanese Application No. 95123303, ROC Office Action, additional Non Final Rejection dated Mar. 20, 2012 with English Translation.
From Taiwanese Application No. 95123303, ROC Office Action, Decision to Reject dated Jun. 27, 2012 with English Translation.
From Taiwanese Application No. 95123303, ROC Office Action, Non Final Rejection dated Mar. 20, 2012 with English Translation.
From United Kingdom Application No. GB0722887.7, UK Office Action dated Dec. 4, 2008.
From United Kingdom Application No. GB0800954.0, UK Office Action dated Dec. 5, 2008.
From U.S. Appl. No. 11/173,182 (Now U.S. Pat. No. 7,830,310), additional Final Rejection dated Jan. 28, 2010.
From U.S. Appl. No. 11/173,182 (Now U.S. Pat. No. 7,830,310), Final Rejection dated Apr. 30, 2007.
From U.S. Appl. No. 11/173,182 (Now U.S. Pat. No. 7,830,310), Final Rejection dated Dec. 9, 2008.
From U.S. Appl. No. 11/173,182 (Now U.S. Pat. No. 7,830,310), Final Rejection dated Jan. 28, 2010.
From U.S. Appl. No. 11/173,182 (Now U.S. Pat. No. 7,830,310), Non-Final Rejection dated Aug. 14, 2009.
From U.S. Appl. No. 11/173,182 (Now U.S. Pat. No. 7,830,310), Non-Final Rejection dated Aug. 15, 2007.
From U.S. Appl. No. 11/173,182 (Now U.S. Pat. No. 7,830,310), Non-Final Rejection dated Feb. 4, 2008.
From U.S. Appl. No. 11/173,182 (Now U.S. Pat. No. 7,830,310), Non-Final Rejection dated Jul. 30, 2008.
From U.S. Appl. No. 11/173,182 (Now U.S. Pat. No. 7,830,310), Non-Final Rejection dated May 16, 2006.
From U.S. Appl. No. 11/173,182 (Now U.S. Pat. No. 7,830,310), Notice of Allowance dated Jul. 22, 2010.
From U.S. Appl. No. 11/173,182 (Now U.S. Pat. No. 7,830,310), Requirement/Election dated Apr. 23, 2009.
From U.S. Appl. No. 11/173,182 (Now U.S. Pat. No. 7,830,310), Restriction/Election dated Jan. 10, 2007.
From U.S. Appl. No. 11/173,187 (Now U.S. Pat. No. 7,218,281), additional Notice of Allowance dated Jan. 9, 2007.
From U.S. Appl. No. 11/173,187 (Now U.S. Pat. No. 7,218,281), Non-Final Rejection dated May 31, 2006.
From U.S. Appl. No. 11/173,187 (Now U.S. Pat. No. 7,218,281), Notice of Allowance dated Jan. 9, 2007.
From U.S. Appl. No. 12/138,083 (Now U.S. Pat. No. 7,911,407), Non-Final Rejection dated Aug. 2, 2010.
From U.S. Appl. No. 12/138,083 (Now U.S. Pat. No. 7,911,407), Notice of Allowance dated Nov. 15, 2010.
From U.S. Appl. No. 13/744,295 (Now U.S. Pat. No. 9,246,204), Final Rejection dated May 5, 2015.
From U.S. Appl. No. 13/744,295 (Now U.S. Pat. No. 9,246,204), Non-Final Rejection dated Oct. 16, 2014.
From U.S. Appl. No. 13/744,295 (Now U.S. Pat. No. 9,246,204), Notice of Allowance dated Sep. 16, 2015.
From U.S. Appl. No. 14/310,895 (Now U.S. 2015/0372390 A1), Non Final Rejection dated Mar. 9, 2017.
From U.S. Appl. No. 14/310,895 (Now U.S. 2015/0372390 A1), Non Final Rejection dated May 3, 2018.
From U.S. Appl. No. 14/310,895 (Now U.S. 2015/0372390 A1), Non Final Rejection dated Sep. 6, 2017.
From U.S. Appl. No. 14/310,895 (Now U.S. 2015/0372390 A1), Non-Final Rejection dated Jan. 21, 2016.
From U.S. Appl. No. 14/737,100 (unpublished), Non-Final Rejection dated Sep. 5, 2017.
From U.S. Appl. No. 14/737,100 (unpublished), Final Rejection dated Feb. 23, 2018.
Office action from Chinese Patent Application No. 201580024969.5 dated Sep. 20, 2018 with Search Report and its English translation.
Office action from European Patent Application No. 15810252.5 dated Dec. 14, 2018.
Office Action for European Patent Application No. 15810252.5, dated Sep. 18, 2019.

\* cited by examiner

METASURFACES FOR IMPROVING CO-SITE ISOLATION FOR ELECTRONIC WARFARE APPLICATIONS

CROSS REFERENCE TO RELATED APPLICATIONS

This application a continuation in part of U.S. patent application Ser. No. 14/737,100, filed Jun. 11, 2015, is related to U.S. Pat. No. 7,911,407, issued Mar. 22, 2011, U.S. Pat. No. 9,246,204, issued Jan. 26, 2016, U.S. patent application Ser. No. 15/233,899, filed Aug. 10, 2016, and U.S. patent application Ser. No. 15/344,363, filed Nov. 4, 2016, and is related to and claims priority from U.S. Provisional Application No. 62/011,447 filed Jun. 12, 2014 and U.S. patent application Ser. No. 14/737,100, filed Jun. 11, 2015, which are incorporated herein by reference as though set forth in full.

STATEMENT REGARDING FEDERAL FUNDING

NONE

TECHNICAL FIELD

This disclosure relates to devices and methods for increasing the isolation between sensitive receivers and nearby transmitters, such as jamming systems.

BACKGROUND

A jammer can interfere with receivers on the same platform through two pathways: coupling through free-space propagation including multi-path effects and surface wave (SW) coupling or "shin effects", as shown in FIG. 1. Together, these two effects can saturate the receiver by 100+dB. Free-space coupling may be reduced by antenna gain pattern isolation, polarization mismatch, and distance isolation.

In FIG. 1 a transmitting antenna 10, which may be a jammer, transmits a signal. The transmitted signal may travel through free space pathway 12 to a receiving antenna 22. The transmitted signal may also travel to a nearby object 16 through free space pathway 14 and reflect off the nearby object 16 resulting in a multi-path signal 18, which may also travel to the receiving antenna 22. A surface wave signal 20 that travels along surface 19 may also travel to the receiving antenna 22, and if there is a scatterer 24 on the surface, then the scatterer 24 may radiate a surface wave portion 26 into free space and that radiated portion may travel to the receiving antenna 22. The receiving antenna 22 is generally connected by connection 30 to filtering electronics 32, which may attempt to reduce the signal coupling from the transmitting antenna 10 by filtering based on frequency. The filtering electronics 32 is generally connected to a sensitive receiver 34.

SWs 20 that reach the receiving antenna 22 can directly couple into the antenna, as shown by pathways 12 and 18. Additionally, as the surface waves 20 propagate along the surface 19 toward the receiver 22, they may scatter off obstacles or scatterers 24, which may be, for example, seams and rivets in the path, causing radiated interference 26.

Today, magnetic radar absorbing material (MAGRAM) is typically used to reduce the effects of surface wave (SWs) through dissipative loss. While MAGRAM has some advantages, such as wide bandwidth, it is export controlled, expensive, and heavy. Often, its weight makes it unsuitable to place on aircraft wings. MAGRAM is also thick and may have a thickness of 0.5 inch at 15 GHz.

Electromagnetic band-gap materials (EEGs) have also been used in the prior art and suppress surface currents by radiating energy into free space; however, because the radiation is uncontrolled, there may be unintended adverse consequences, especially if the EBG surfaces are in the vicinity of various stores, the wings, pylons, and the fuselage. EBGs can be realized as printed-circuit board structures consisting of patterned metal over a grounded substrate. However, these EBGs often contain vias which add to the fabrication cost and limit their physical flexibility and ability to be conformal to surfaces with complex shapes, such as wings. Typically EBGs do not provide for tailored direction-dependent behavior, polarization control, or beam shaping.

Impedance surfaces have been designed in the past, primarily to control radiation, as described in Reference 1 and 2 listed below, which are incorporated herein by reference. Impedance surfaces have also been used for surface wave guidance to some degree, as described in Reference 3 listed below, which is incorporated herein by reference. However, these references do not describe phase and power profile shaping, polarization control, and absorption. The references also do not address exhibiting a combination of effects such as re-radiation, polarization control, absorption, deliberate guiding, or angle-dependent behavior, in which incident waves from one direction can be re-routed but those from an orthogonal direction are allowed to pass through.

What is needed is to improve the overall isolation between a jammer or other transmitter and a receiver by addressing the surface wave (SW) component of the interference. The embodiments of the present disclosure answer these and other needs.

SUMMARY

In a first embodiment disclosed herein, a method for providing control of surface waves propagating on a surface comprises forming a surface treatment on the surface, wherein the surface treatment is configured to achieve a tensor surface admittance distribution matrix on the surface determined according to a modified transformation electromagnetics (tEM) equation $$\begin{pmatrix} Y_{xx} & Y_{xy} \\ Y_{yx} & Y_{yy} \end{pmatrix}_{\pm} = -\begin{pmatrix} 1 & 0 \\ 0 & 1 \end{pmatrix} k0^2 -$$

$$\begin{pmatrix} -\mathrm{Sin}[\phi]^2 & \mathrm{Sin}[\phi]\mathrm{Cos}[\phi] \\ \mathrm{Sin}[\phi]\mathrm{Cos}[\phi] & -\mathrm{Cos}[\phi]^2 \end{pmatrix} k^2 \Bigg) \frac{1}{\sqrt{k0^2 - k^2}} \frac{Y0^2 - Yiso^2}{2k0Y0} \pm$$

$$\left(\begin{pmatrix} -\mathrm{Cos}[\phi + \theta] & -\mathrm{Sin}[\phi + \theta] \\ -\mathrm{Sin}[\phi + \theta] & \mathrm{Cos}[\phi + \theta] \end{pmatrix} k0^2 + \right.$$

$$\begin{pmatrix} -\mathrm{Sin}[\phi]^2 & \mathrm{Sin}[\phi]\mathrm{Cos}[\phi] \\ \mathrm{Sin}[\phi]\mathrm{Cos}[\phi] & -\mathrm{Cos}[\phi]^2 \end{pmatrix} k^2 \mathrm{Cos}[\theta - \phi] \right) \frac{1}{\sqrt{k0^2 - k^2\mathrm{Cos}[\theta - \phi]^2}}$$

$$\frac{Y0^2 - Yiso^2}{2k0Y0}$$

where:
Θ=an angle of power flow
b=Tan [Θ]
k=a tangential wave vector

Φ=an angle of the tangential wave vector
k0=a free space wave number
Y0=an admittance of free space=1/(120*π), and
Yiso=a surface admittance of an untransformed surface.

In another embodiment disclosed herein, a device for providing control of surface waves propagating on a surface comprises a surface treatment on the surface, wherein the surface treatment is configured to achieve a tensor surface admittance distribution matrix on the surface determined according to a modified transformation electromagnetics (tEM) equation $$\begin{pmatrix} Yxx & Yxy \\ Yyx & Yyy \end{pmatrix}_{\pm} = \left(-\begin{pmatrix} 1 & 0 \\ 0 & 1 \end{pmatrix}k0^2 - \right.$$

$$\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix}k^2 \right)\frac{1}{\sqrt{k0^2-k^2}}\frac{Y0^2-Yiso^2}{2k0Y0} \pm$$

$$\left(\begin{pmatrix} -\text{Cos}[\phi+\theta] & -\text{Sin}[\phi+\theta] \\ -\text{Sin}[\phi+\theta] & \text{Cos}[\phi+\theta] \end{pmatrix}k0^2 + \right.$$

$$\left.\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix}k^2\text{Cos}[\theta-\phi]\right)\frac{1}{\sqrt{k0^2-k^2\text{Cos}[\theta-\phi]^2}}$$

$$\frac{Y0^2-Yiso^2}{2k0Y0}$$

where:
Θ=an angle of power flow
b=Tan [Θ]
k=a tangential wave vector
Φ=an angle of the tangential wave vector
k0=a free space wave number
Y0=an admittance of free space=1/(120*π), and
Yiso=a surface admittance of an untransformed surface.

These and other features and advantages will become further apparent from the detailed description and accompanying figures that follow. In the figures and description, numerals indicate the various features, like numerals referring to like features throughout both the drawings and the description.

DETAILED DESCRIPTION

Figure 1:
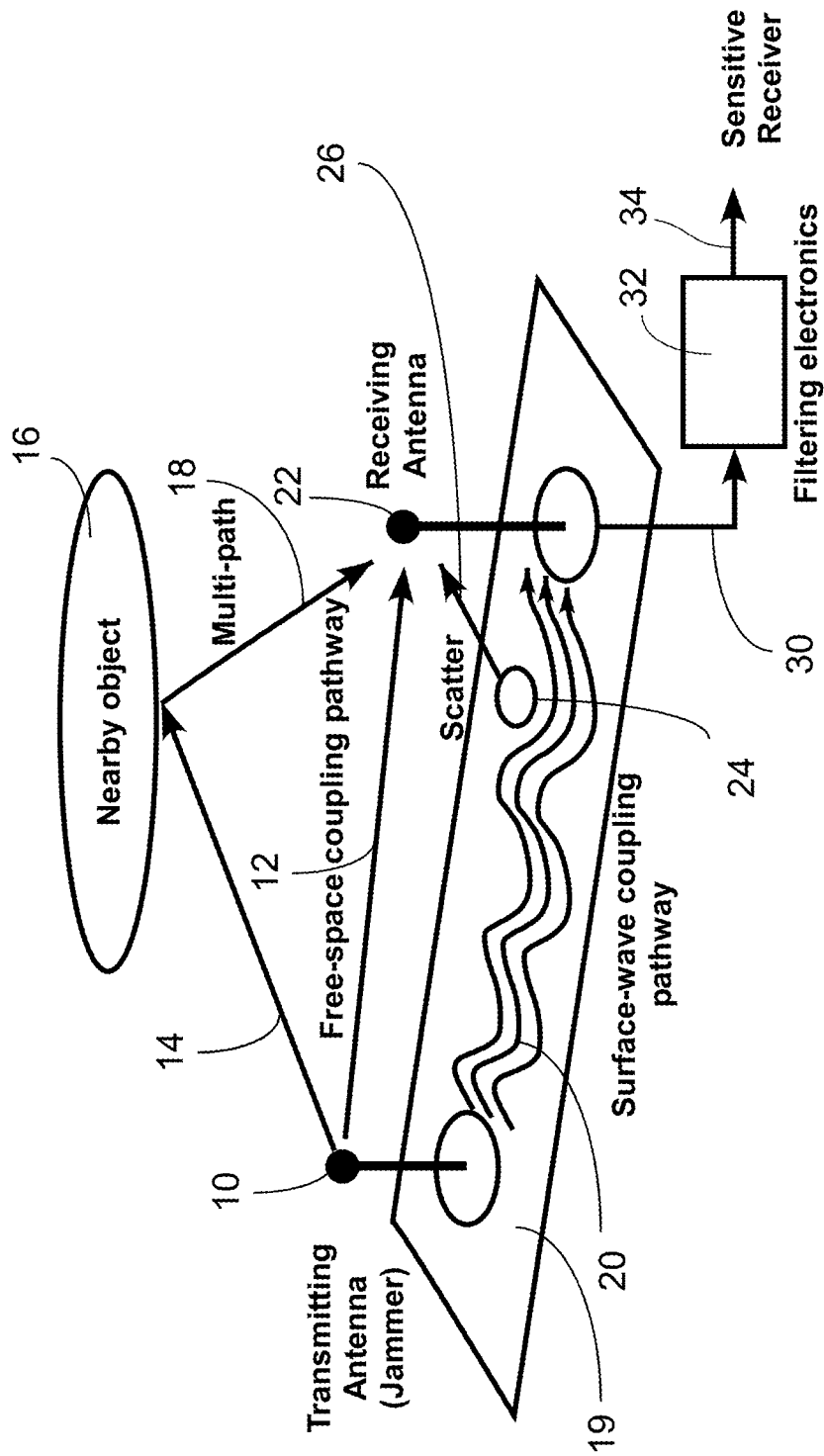
FIG. 1 shows a propagation model showing pathways of interference between a jammer and a receiver in accordance with the prior art.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes an engineered metasurface, which can be integrated onto the surfaces of vehicles and other existing platforms for the purpose of increasing the isolation between sensitive receivers and nearby transmitters, such as jamming systems, located on the same platform by reducing interference due to surface waves (SWs) by 30-40 dB. The present disclosure also facilitates simultaneous transmit and receive (STAR) operations for systems that can receive or listen while transmitting. This is particularly desirable for electronic warfare systems.

The present disclosure describes a passive, low-profile, lightweight, low-cost, conformal surface or "skin" to treat the surfaces of vehicles in order to shield sensitive surface-mounted electronics from surface wave (SW) interference caused by a jammer on the same platform. The surface treatments can manipulate SWs generated by a jammer, or another transmitting source, in a number of ways. Depending on the particular physical and electromagnetic environment, the surface treatment can be designed to perform some combination of SW re-direction, absorption, polarization conversion, and re-radiation to reduce SW power in a specified region. These surface treatments may be implemented with scalar (isotropic) and tensor (anisotropic) impedance surfaces.

The resulting improvement in isolation enabled by the present disclosure provides multiple benefits, including the ability to increase jamming power, decrease burn-through, reduce spacing between a jammer and a receiver, and/or reduce the complexity of front-end filtering electronics and isolation modules. Additionally, surface wave (SW) isolation loosens the constraints on jammer design, for example, side-lobe levels, and frees up the critical design space necessary to exceed or improve other jammer specifications. While there are operational techniques that can be used to distinguish jamming signals from received signals, such as by using frequency management where the receiver performs its search function in bands that are not being jammed, physically increasing the isolation between these signals enables more flexibility in system design and greater overall system performance.

SWs that reach the receiving antenna can directly couple into the antenna. Additionally, as they propagate along the vehicle's surface toward the receiver, they may scatter off obstacles, for example seams and/or rivets in the path, causing radiated interference. Using targeted surface treatments to control the surface waves (SWs), the coupling through the SW pathway may be reduced by 30-40 dB. This can result in an improvement in overall system isolation by 20%-30% in some operational environments. By mitigating the SW contribution, a major component of the coupling is addressed. Before the SW coupling to the receiver typically had to be mitigated through operational techniques, such as receiving or listening only when not transmitting, and electronic filtering.

Figure 2:
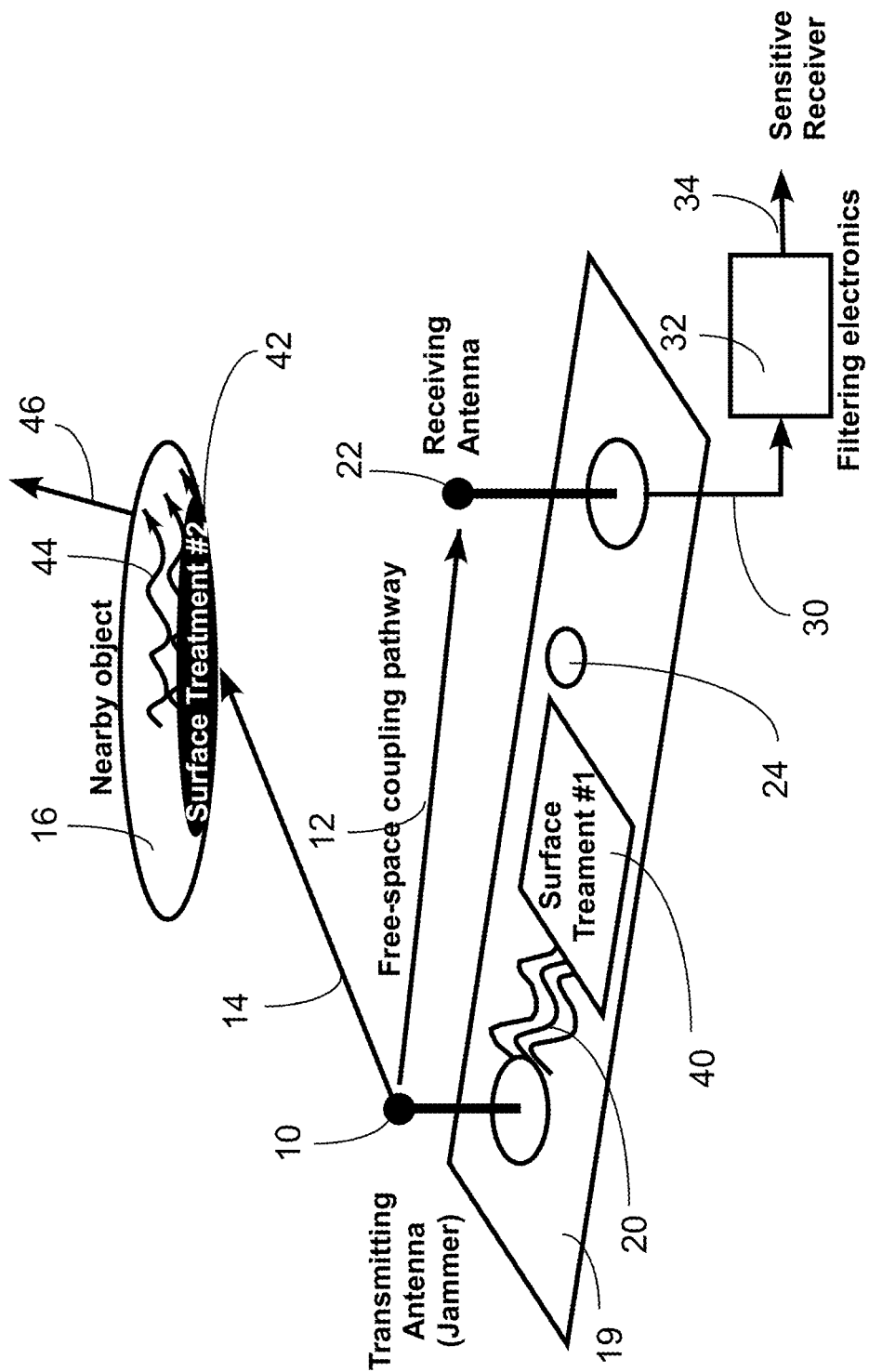
FIG. 2 shows using a surface treatment for mitigating surface waves in accordance with the present disclosure.

FIG. 2 shows using surface treatments for mitigating surface waves in accordance with the present disclosure. The transmitting antenna 10, which may be a jammer, transmits a signal. The transmitted signal may still travel through free space pathway 12 to a receiving antenna 22. The transmitted signal may also travel to a nearby object 16 through free space pathway 14. By treating the nearby object 16 with a surface treatment 42 in accordance with the present disclosure, reflection of the signal towards the receiving antenna 22 is prevented. Instead, the surface treatment 42 may be configured to cause the signal received from free space pathway 14 that propagates as surface wave 44 on the object 16, to be radiated away from the receiving antenna, such as in direction 46, or may cause polarization conversion of the signal.

Surface wave signals 20 that travel along surface 19 may be prevented from reaching the receiving antenna 22 or scatterers 24 on the surface by surface treatment 40, which may be configured to radiate the energy in the surface wave 20 into free space, to change the direction of the SW away from the receiving antenna 22, or may cause polarization conversion of the signal.

Figure 3:
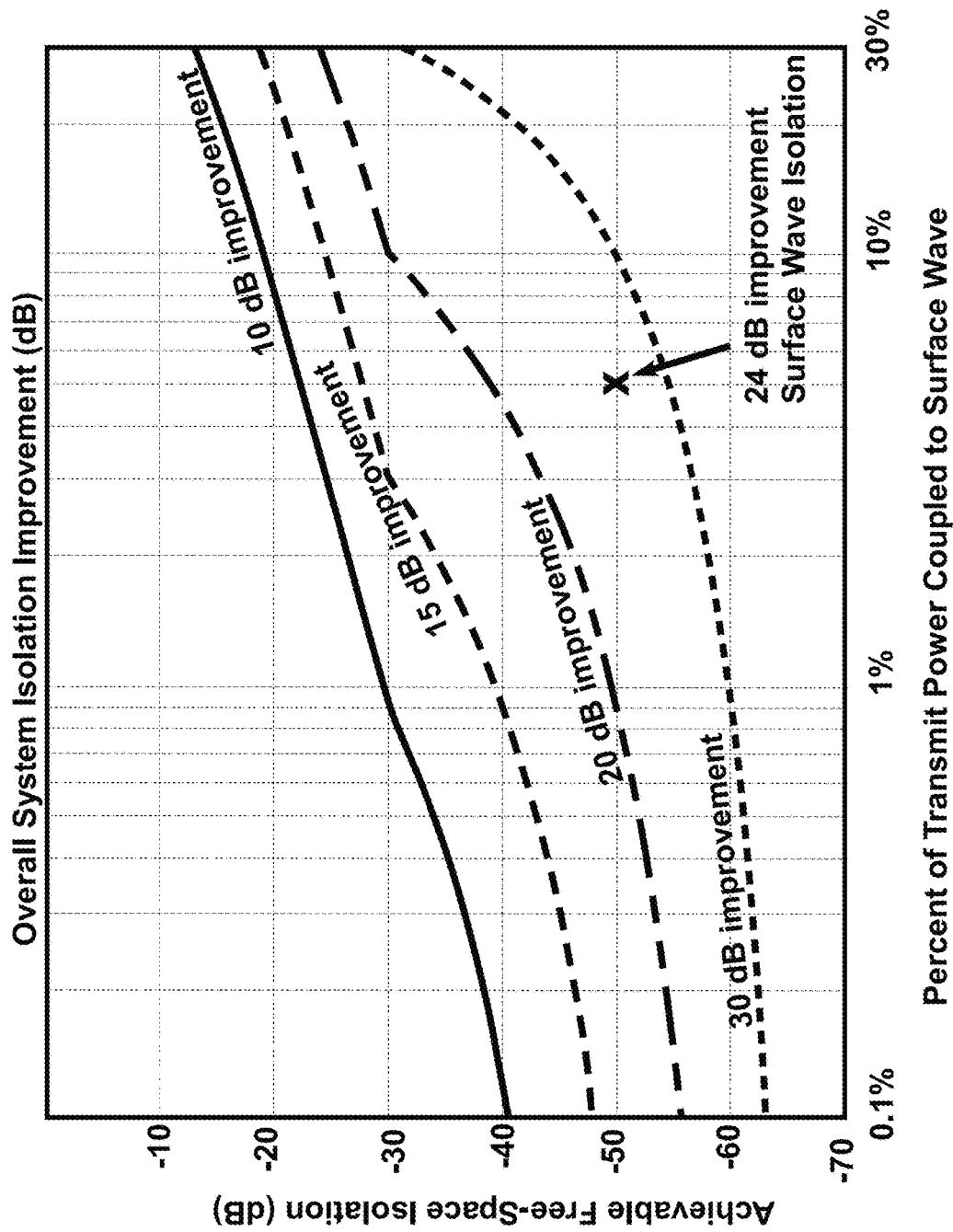
FIG. 3 shows the system isolation improvement when the surface wave component of the coupling between a jammer and a receiver is reduced by 30 dB in accordance with the present disclosure.

FIG. 3 shows the overall system benefit of reducing SW coupling by 30 dB based on a range of situational parameters. An example is shown and marked by X. In this example, 5% of the transmitter power is coupled into SWs and the remaining free-space coupling is reduced by 50 dB. By mitigating the SWs, an additional system isolation of 24 dB is gained. This improvement translates to an additional 24 dB of jamming power that can be deployed without impacting the listening capability, or, if the jamming power remains the same, to a 24 dB improvement in the lowest detectable signal for the receiver 34. The actual benefits of SW reduction will vary from system to system, depending on factors such as the fraction of jamming power that is coupled into SWs.

The capabilities outlined in this disclosure have clear applications to simultaneous transmit and receive (STAR) applications for electronic warfare (EW); however, the present disclosure provides a general ability to control SWs induced on vehicle surfaces or other existing platforms due to any other intentional and unintentional sources. Relevant applications include: 1) cloaking or radar cross section (RCS) reduction; 2) shielding from high power microwave attacks; and 3) beam shaping with conformal antennas. Surface treatments in accordance with the present disclosure can be applied to a variety of platforms, including unmanned airborne vehicles (UAVs), planes, ships, and other vehicles, such as automobiles.

Figure 4:
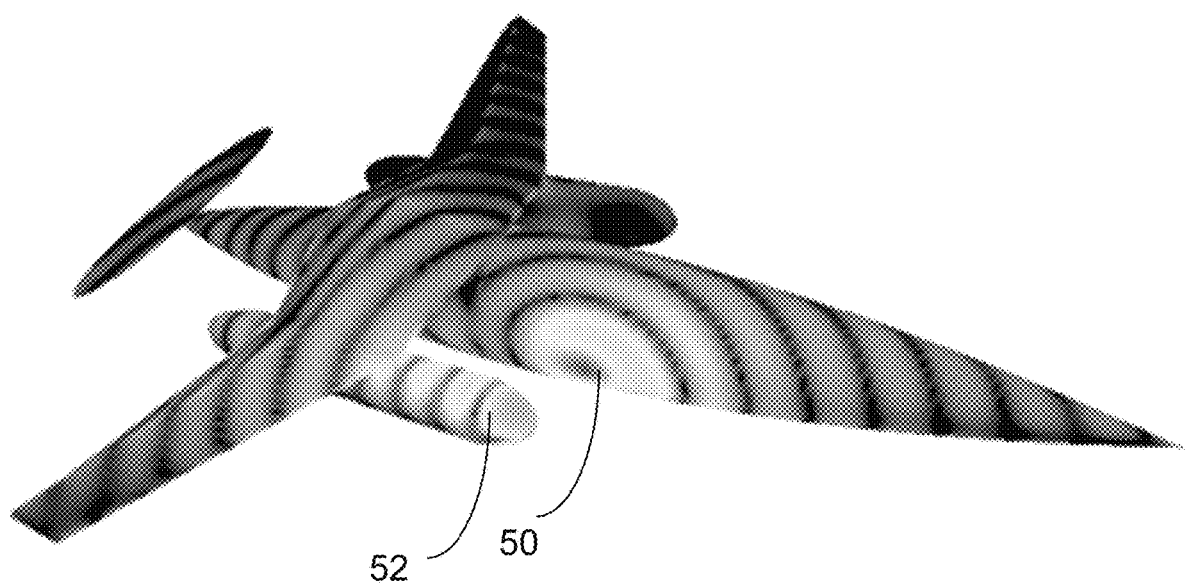
FIG. 4 shows surface currents induced on the fuselage due to a jammer located on a pod under the wing of an aircraft in accordance with the present disclosure.
Figure 13B:
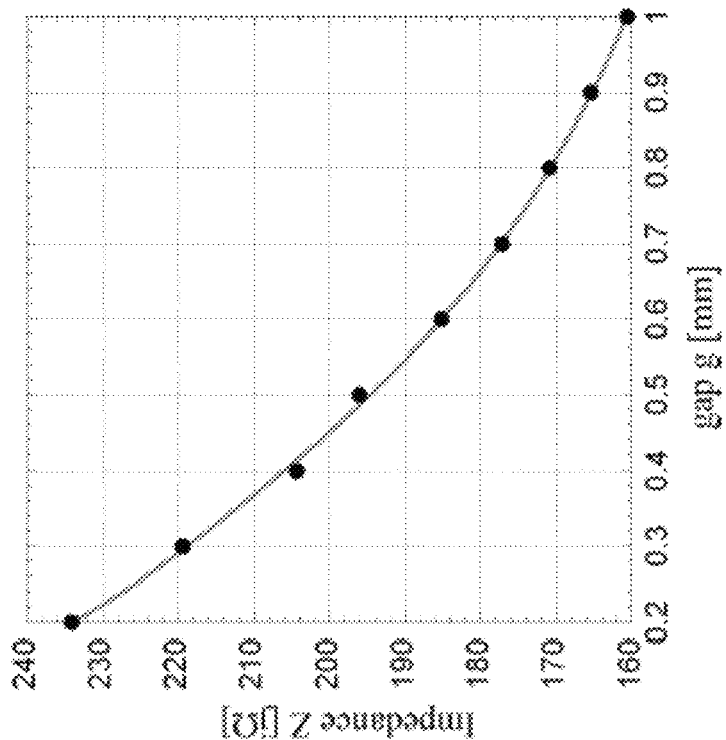
FIGS. 13A and 13B show an artificial surface treatment to achieve an isotropic reactive surface impedance or admittance value at any point on a surface, and a graph of the impedance versus gap size, respectively, in accordance with the prior art.
Figure 13A:
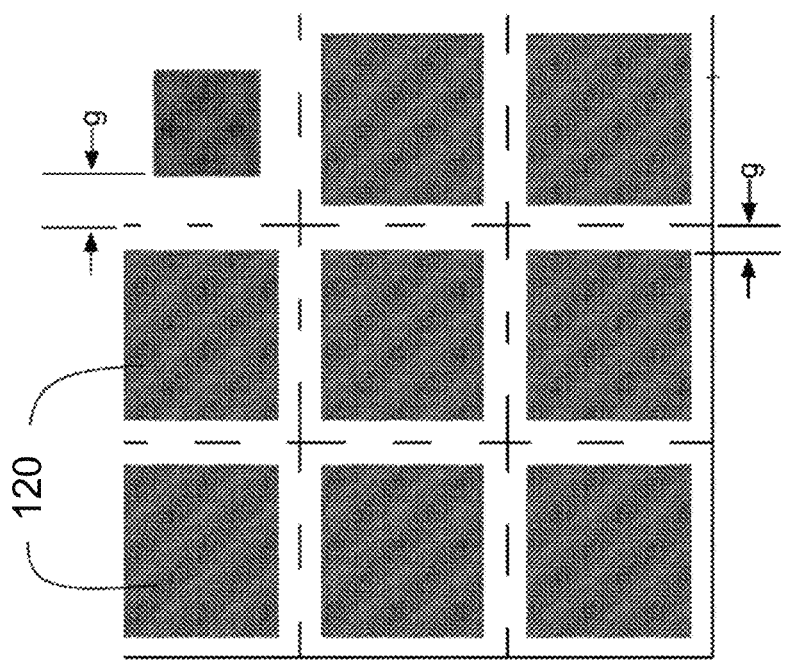

The present disclosure of a conformal surface treatment is simple to fabricate and may be retro-fitted onto vehicle surfaces to reduce SWs and improve the isolation of the receiver. The surface treatment may be placed near the jammer, near the receiver, or near other surface-current hot spots, as shown in the example of FIG. 4, showing hot spots 50 and 52. The surface treatment is meant to supplement, rather than replace, current isolation methods since it primarily mitigates the coupling through SWs and not through free space. In most cases, electronics for filtering or signal processing will still be necessary, however, their workload may be reduced, which may translate to significant cost savings for these very expensive interference-canceling modules. One type of surface treatment is an artificial impedance surface created by metal patterning on a thin dielectric surface above a ground plane. By varying the local size and spacing of the metal patterns 120, specific reactive surface impedance or admittance values can be achieved at any given point on the surface. FIG. 13A, which is described further in Reference 3, listed below, shows an example of metal patterning with subwavelength square patches, with the gap size between patches being the parameter determining the local effective surface impedance.

By simulating or measuring metal patterns with different geometrical parameters, one can build a table of surface impedance values as a function of geometrical parameters. FIG. 13B, which is described further in Reference 3, listed below, show a graph of how the impedance/admittance of the surface treatment of FIG. 13A varies as a function of gap size. The curve in FIG. 13B was derived using simulations of surface impedance for square patches as a function of gap size. This functional relation can be used to select the proper size gap size to achieve the desired surface impedance value at a given location on the surface. By varying the size of the patches on the surface according to this relation, one can thus realize surface impedance distributions which have been designed to improve isolation.

Figure 14A:
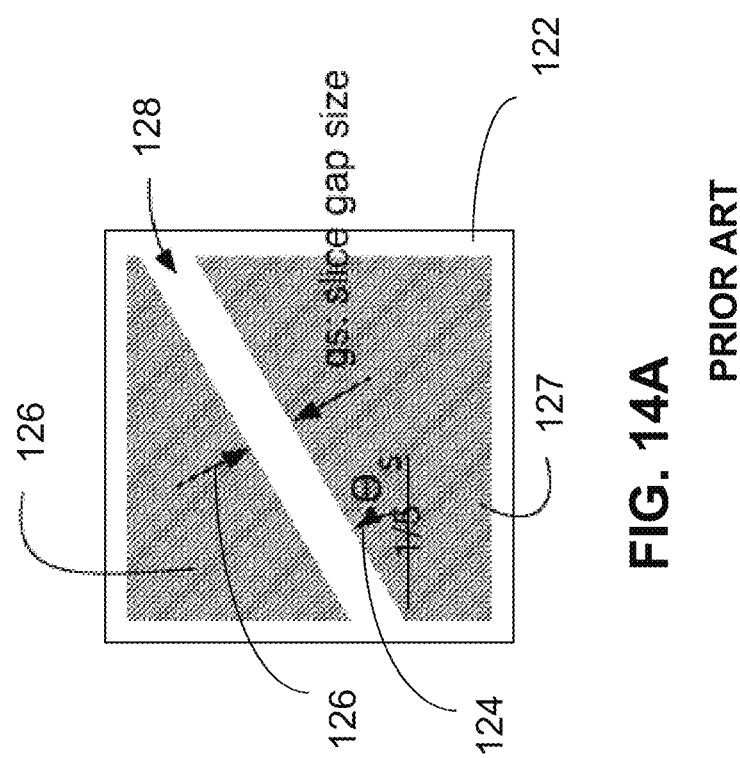
FIGS. 14A, 14B, 14C, 14D and 14E show artificial surface treatments to achieve anisotropic or tensor direction dependent surface impedances or admittance values in accordance with the prior art.

Patterns created with square patches produce isotropic surface impedance, which can be used to guide the power and phasefront of a surface wave in the same direction. To guide phase and power in different directions, anisotropic or tensor direction-dependent surface impedances must be realized, meaning that the effective impedance seen by a surface wave depends on its propagation direction. Various other geometries for the metal patches can be used to realize tensor or anisotropic surface impedance. One example of such a unit cell is shown in FIG. 14A, which is further described in reference 3, listed below. The unit cell of FIG. 14A has a slice 128 between two metal patches 126 and 127. For the sliced patch shown in FIG. 14A, two additional parameters determine the surface impedance achieved with this geometry. In addition to the peripheral gap size "g" 122, the surface impedance is controlled by the slice angle "$\theta_s$" 124 and the slice gap size "gs" 126. The process of generating an impedance table as a function of geometrical parameters is the same as for the square patch of FIG. 13A, with the only difference being that there are now three geometrical parameters and the surface impedance is a two by two matrix with three independent values instead of being just a scalar.

Figure 14B:
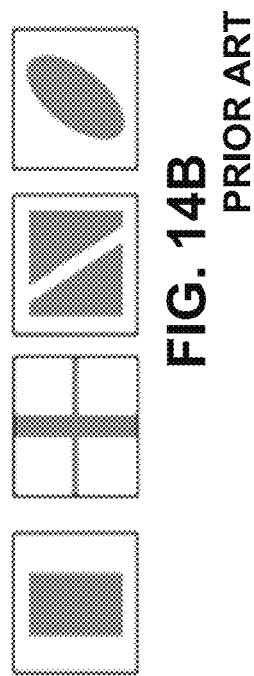

Various other types of unit cell geometries can be used for metal patterning, as shown in FIG. 14B, which is further described in Reference 17, listed below. Co-site isolation impedance distributions surfaces can be realized with them using the same process of generating surface impedance tables as a function of geometrical parameters.

Figure 14D:
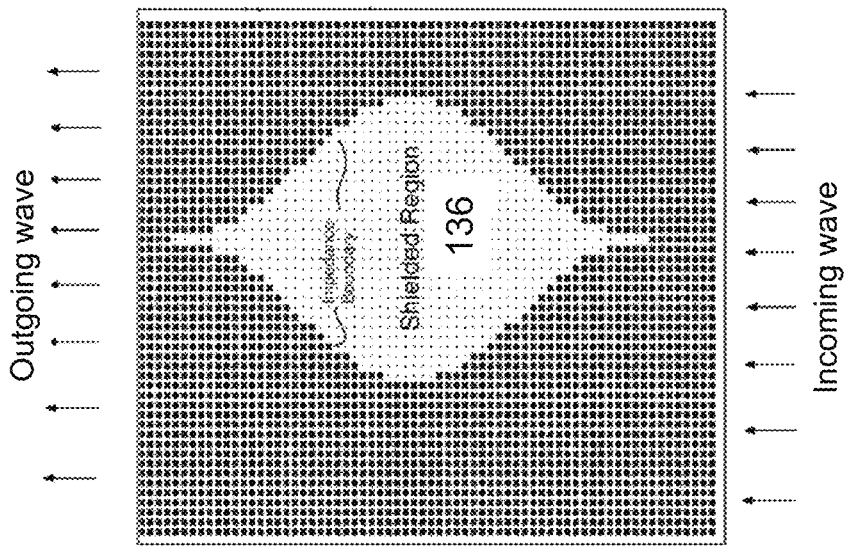
Figure 14C:
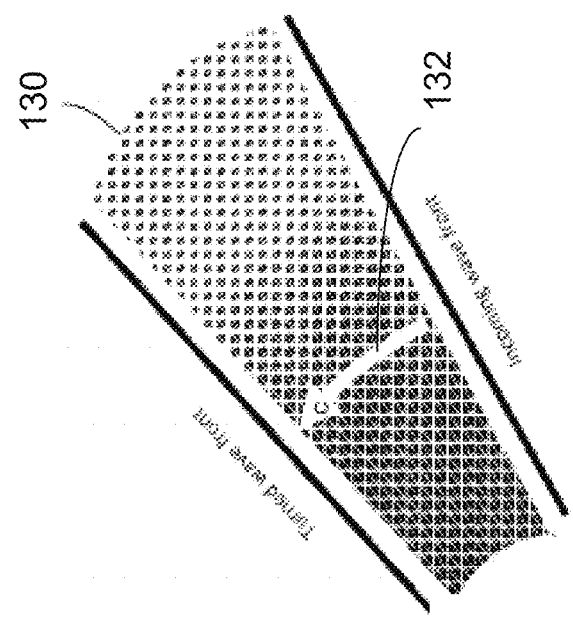

FIG. 14C shows a surface impedance treatment, which is further described in Reference 3, listed below, using the sliced patches 130, as shown in FIG. 14A. The impedance distribution in FIG. 14C is configured to steer surface waves along a circular path 132. FIG. 14D, which is further described in Reference 3, listed below, shows another example of a surface treatment. This surface treatment shields a central portion 136 of the surface from a surface wave traveling on the surface. This surface treatment configuration can be used to shield a transmitter or receiver from stray surface waves.

Figure 14E:
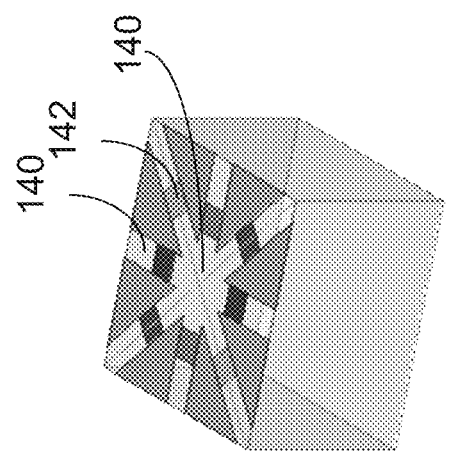

Another type of surface treatment consists of using metal patterns with added lumped circuit elements, such as capacitors, resistors and inductors, to significantly increase the range of realizable surface impedance values, thus enabling more control over surface waves. Surface treatments with such cells are designed in a fashion similar to the passive unit cells. Simulations or measurements can be used to generate a surface impedance/admittance value table as a function of cell geometry parameters and lumped circuit parameters, such as resistance, inductance, and capacitance. Cell configurations may then be selected from the table to achieve desired surface impedance values at each location of the surface on which the treatment is being applied. FIG. 14E, which is further described in Reference 18, listed below, shows a unit cell for such a surface treatment. The unit cell has a metal pattern 140 loaded with lumped circuit elements 142.

In real world scenarios, jammers meant to blind enemy radars often blind friendly radars, early warning receivers and other communication systems located on the same vehicle. Frequency management is often used when the receiver isolation is not high enough to listen while jamming. However, this restricts the jamming effectiveness, since a jammer may not be able to sufficiently track a frequency-hopping radar, which may make the jamming vehicle vulnerable to attack. The surface treatments of the present disclosure can be used to mitigate this issue.

The surface treatments described in the present disclosure are thin, light, and fairly inexpensive to fabricate. The surface treatments may be based on printed-circuit board and commercial etching technologies. The thickness of the surface treatments may be as low as 25 mils (0.6 mm) at 15 GHz compared to 0.5 inch for MAGRAM. As described above magnetic radar absorbing material (MAGRAM) reduces the effects of surface wave (SWs) through dissipative loss. The surface treatments of the present disclosure may also have dissipative loss properties; however, the surface treatments of the present disclosure are more versatile and have a multi-headed approach including, energy-direction, re-radiation, and polarization conversion.

In the prior art, surface treatments have been configured using a transformation electromagnetics (tEM) method, as described in Reference 5 listed below, which is incorporated herein by reference.

Figure 5B:
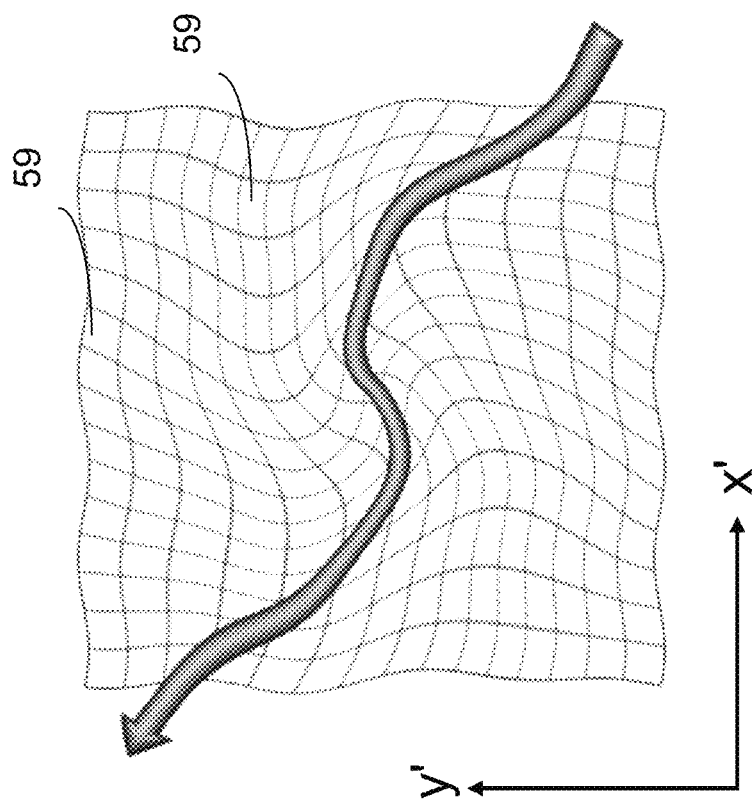
FIG. 5B shows a wave propagating along a warped path in a medium of unit cells possessing anisotropic and inhomogeneous material properties.
Figure 5A:
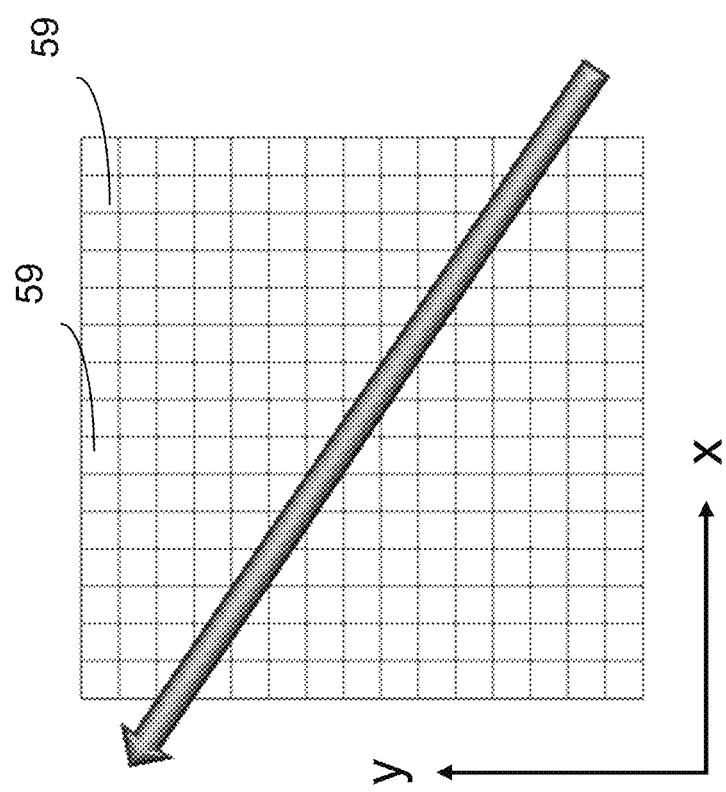
FIG. 5A shows a wave traveling through a medium of isotropic unit cells.

Transformation EM theory was introduced in 2006 and popularized by its application to the invisibility cloak, as described in Reference 4 listed below, which is incorporated herein by reference. The theory enables 3D electromagnetic fields to be tailored into desired spatial patterns. Fields can be converted from an initial state to a desired state by transforming the properties of the underlying medium through which the waves propagate. In general, the transformed materials are anisotropic and inhomogeneous, as shown in FIG. 5B, as opposed to the isotropic surface of the material shown in FIG. 5A. The transformed anisotropic and inhomogeneous materials support wave propagation along new prescribed paths. A variety of exotic microwave and optical devices such as cloaks, beam-benders, and field rotators have been designed using tEM.

However, the 2D and 3D tEM theory in the prior art is invalid for SWs and it is limited to directing wavefronts. The present disclosure describes a modified tEM theory for surface treatments to transform not just SW propagation wavefronts, but also control SW direction of power flow, SW power density distribution, and SW polarization. The theory is also modified to yield transformed surface impedances, rather than material parameters such as μ and ε, because surface impedance is a better parameter for modeling thin surfaces. The modified transformation electromagnetics (tEM) method allows a SW propagating through a surface treatment to have tailored phase, power, and polarization distributions to control the propagation of the SW in a prescribed manner. The surface treatments configured with the modified transformation electromagnetics (tEM) method may also be configured to have loss dissipation properties, to reduce the energy or power of the SW as it propagates along the surface treatment.

The modified teM equation of the present disclosure that solves for the necessary surface admittance/impedance of the surface treatment is shown below.

$$\begin{pmatrix} Yxx & Yxy \\ Yyx & Yyy \end{pmatrix}_{\pm} = -\begin{pmatrix} 1 & 0 \\ 0 & 1 \end{pmatrix} k0^2 -$$

$$\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix} k^2 \Bigg) \frac{1}{\sqrt{k0^2 - k^2}} \frac{Y0^2 - Yiso^2}{2k0Y0} \pm$$

$$\left( \begin{pmatrix} -\text{Cos}[\phi + \theta] & -\text{Sin}[\phi + \theta] \\ -\text{Sin}[\phi + \theta] & \text{Cos}[\phi + \theta] \end{pmatrix} k0^2 + \right.$$

$$\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix} k^2 \text{Cos}[\theta - \phi] \Bigg) \frac{1}{\sqrt{k0^2 - k^2\text{Cos}[\theta - \phi]^2}}$$

$$\frac{Y0^2 - Yiso^2}{2k0Y0}$$

where
Θ=an angle of power flow
b=Tan [Θ]
k=a tangential wave vector
Φ=an angle of the tangential wave vector
k0=a free space wave number
Y0=an admittance of free space=1/(120*π), and
Yiso=a surface admittance of an untransformed surface.

The standard transformation electromagnetic (tEM) equations, as described in Reference 5, listed below, which is incorporated herein by reference, are derived for 3D bulk waves The above modified tEM equations above are modified in three ways. First, the modified tEM equations are modified to be valid for surface waves, which are waves that exist only very close to a surface and decay exponentially fast away from the surface. These waves are similar to ripples on the surface of water, which are waves that exist only very close to the boundary between water and air. Second, the modified tEM equations are modified to allow separate control of power and phasefront Propagation directions, which the standard tEM equation lacks. Finally, the modified tEM equations are modified to yield surface admittance distributions instead of the 3D distributions of material bulk parameters with the standard tEM equations.

The modified tEM equation provides the required anisotropic and inhomogeneous surface impedance distributions necessary to implement desired field distributions on a surface. The required surface impedance distribution is discretized at a sub-wavelength level and implemented using tensor impedance surfaces (TISs), as described in References 2, 3, 6, 7, 8, 9, 10, 17 and 18, which are listed below and incorporated herein by reference. Scalar impedance surfaces have been explored extensively in the past as described in References 7 and 11 listed below, which are incorporated herein by reference, but the extension to TISs enables enhanced control of surface waves (SWs). TISs allow phase and power directions to be controlled independently and support modes that are a mixture of transverse magnetic (TM) and transverse electric (TE) modes. In a transverse electric (TE) mode there is no electric field in the direction of propagation. These are sometimes called H modes because there is only a magnetic field along the direction of propagation, H is the conventional symbol for magnetic field. In a transverse magnetic (TM) mode there is no magnetic field in the direction of propagation. These are sometimes called E modes because there is only an electric field along the direction of propagation. Modes that are a mixture of transverse magnetic (TM) and transverse electric (TE) modes can have both an electric and a magnetic field in the direction of propagation.

To configure a material surface treatment according to the equation above, a designer can specify over every point of a surface desired directions for power flow and wavefront propagation via the angles θ and ϕ, respectively, of the tEM equation above. These angular distributions can be used as inputs for the tEM equation above which is then solved to produce the tensor surface admittance distribution matrix [Yxx Yxy, Yyx Yyy] for the surface, So the tEM equations tell the designer what the surface impedance or admittance distribution needs to be for a surface wave to follow the propagation path prescribed by the designer. The next step is to realize on the surface the admittance distribution produced by the tEM equations, which may be achieved with metal patterning over a thin dielectric substrate on a ground plane, optionally modified with lumped circuit elements, as described further herein. So, the two steps are involved in designing a surface treatment are: 1) solve the tEM equations to obtain the surface admittance distribution needed to control the surface in a desired/prescribed way; and 2) realize the admittance distribution with a surface treatment, which may be realized in a number of ways as described herein.

Figure 6:
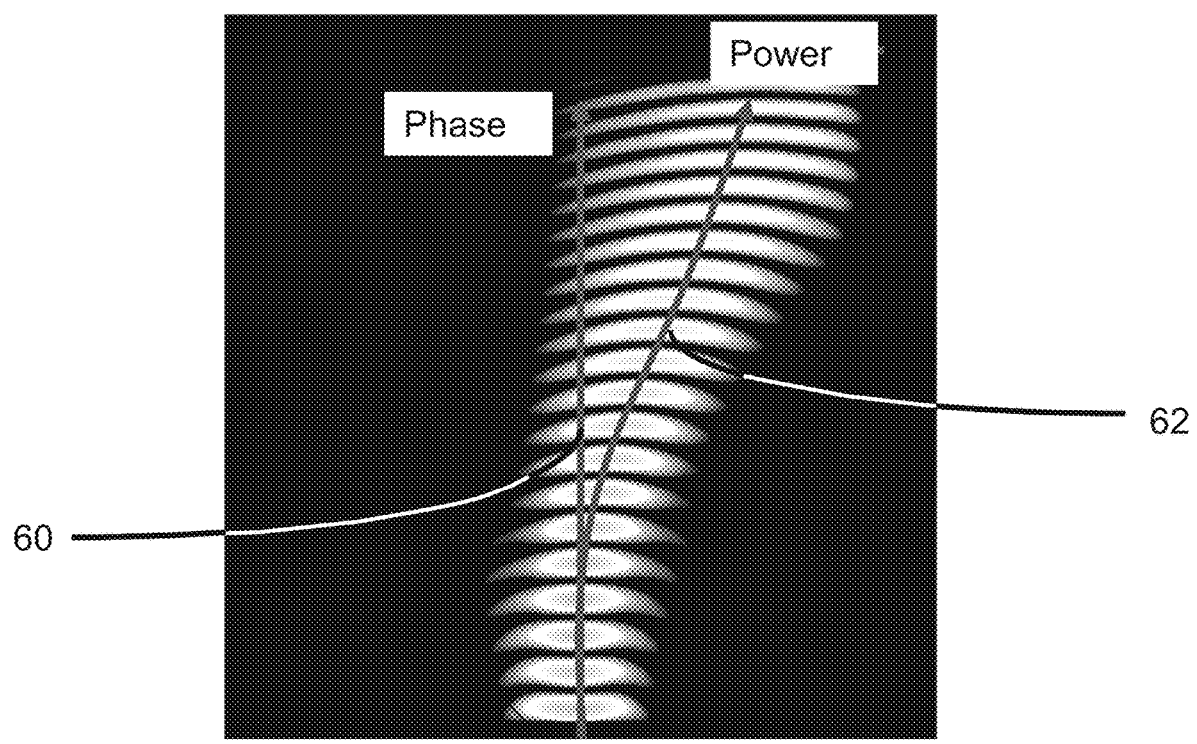
FIG. 6 shows a top view of surface-wave control on a planar surface showing the phase and power in propagating in different directions in accordance with the present disclosure.

When traveling along a tensor impedance surface (TIS), a surface wave (SW) "sees" a different effective surface impedance depending on its angle of propagation along the surface. Therefore, a surface can be designed that behaves differently at varied incident wave directions. TISs also allow phase and power flow directions to be different from each other, as described in Reference 12 listed below, which is incorporated herein by reference. FIG. 6 shows an example of phase 60 and power 62 flowing in different directions.

Figure 5C:
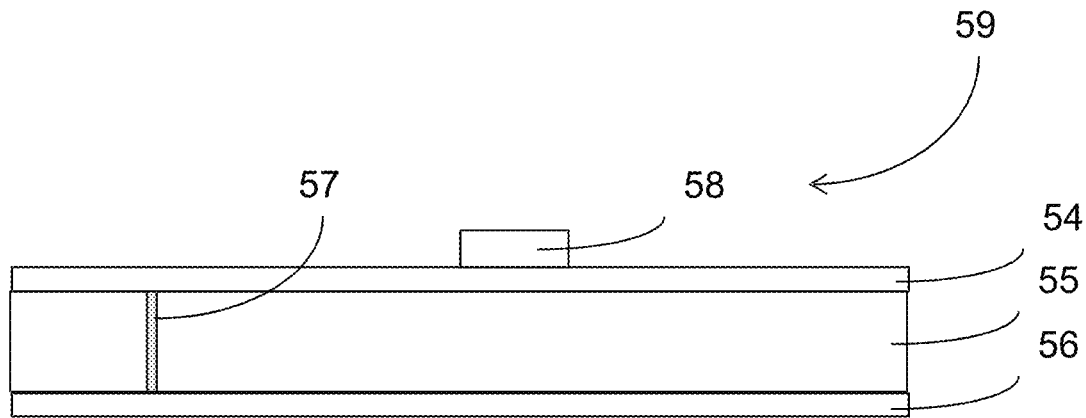
FIGS. 5C and 5D show unit cells in accordance with the present disclosure.
Figure 5D:
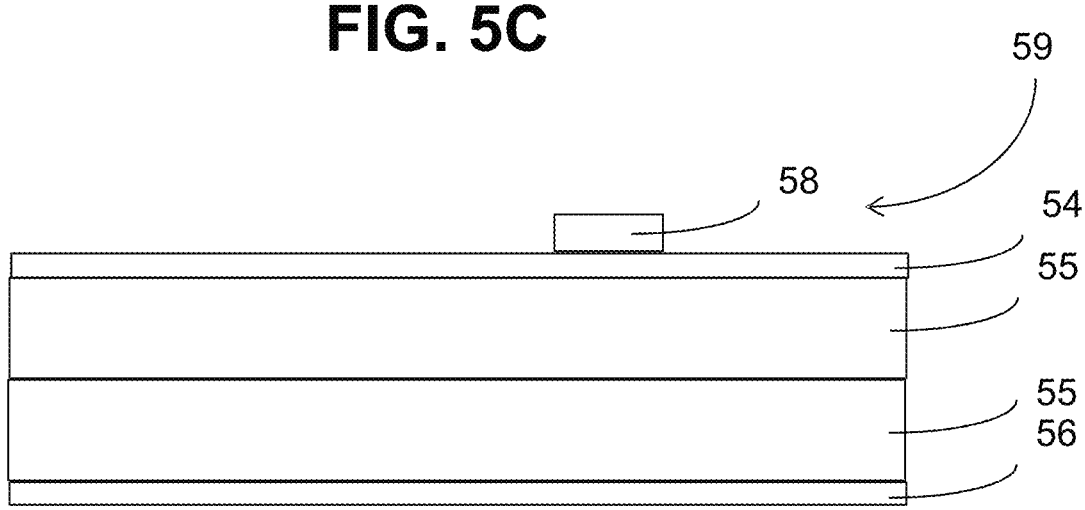

Tensor impedance surfaces (TISs) may be implemented with printed circuit boards, by patterning a metallic cladding 54 above a dielectric substrate 55, which may have a ground plane 56 for grounding, as shown in FIG. 5C. The dielectric substrate 55 may include a printed circuit board. Such a TIS is also described in References 2, 3, 7, 9 and 17, listed below, which are incorporated herein by reference. The required anisotropic and inhomogeneous surface impedance distributions may be realized with arrays of sub-wavelength unit cells 59, as shown in FIGS. 5A, 5B, 5C and 5D, each unit cell 59 consisting of a specific metallic pattern. Inductive or capacitive surface impedances can be realized by choosing the dielectric constant, substrate thickness, and metallic pattern geometry.

The unit cells 59 may be endowed with advanced capabilities by loading the metallic patterns with lumped circuit elements 58, as shown in FIG. 5C, to significantly augment the range of realizable impedance values and to increase the achievable anisotropy, Adding lumped circuit elements, such as capacitors, resistors, inductors, diodes, and varactors provides more flexibility in controlling the SW, enabling more dramatic field variations or size reduction of the surface treatment. Vias 57 through the substrate 55 may also be used to modify the modal properties. Multi-layer unit cells, such as the unit cell shown in FIG. 5D, may be used to provide for bandwidth enhancement, multi-band operation, and enhanced anisotropy. The use of multi-layer surfaces can provide for a wider range of impedance properties without the need for vias 57, which add to fabrication complexity. The multilayer surfaces may have layers of dielectric substrates 55 with different dielectric constants. Thus, embodiments of the present disclosure can include not only existing metal patch patterning, as described in References 2, 3, 7, 9 and 17, listed below, which are incorporated herein by reference, but may also include the aforementioned types of unit cells loaded with lumped elements and multilayer unit cells, as described in Reference 18, listed below, which is incorporated herein by reference.

The SW power at the input of a receiving antenna 22 may be reduced by designing scalar and tensor surface treatments 40 and 42 which leverage the techniques outlined below. These techniques comprise a set of tools which can be combined to achieve the desired effect depending on the specific situation, including frequency of operation, type of antenna, the surrounding electro-magnetic (EM) environment, and so on.

Figure 7:
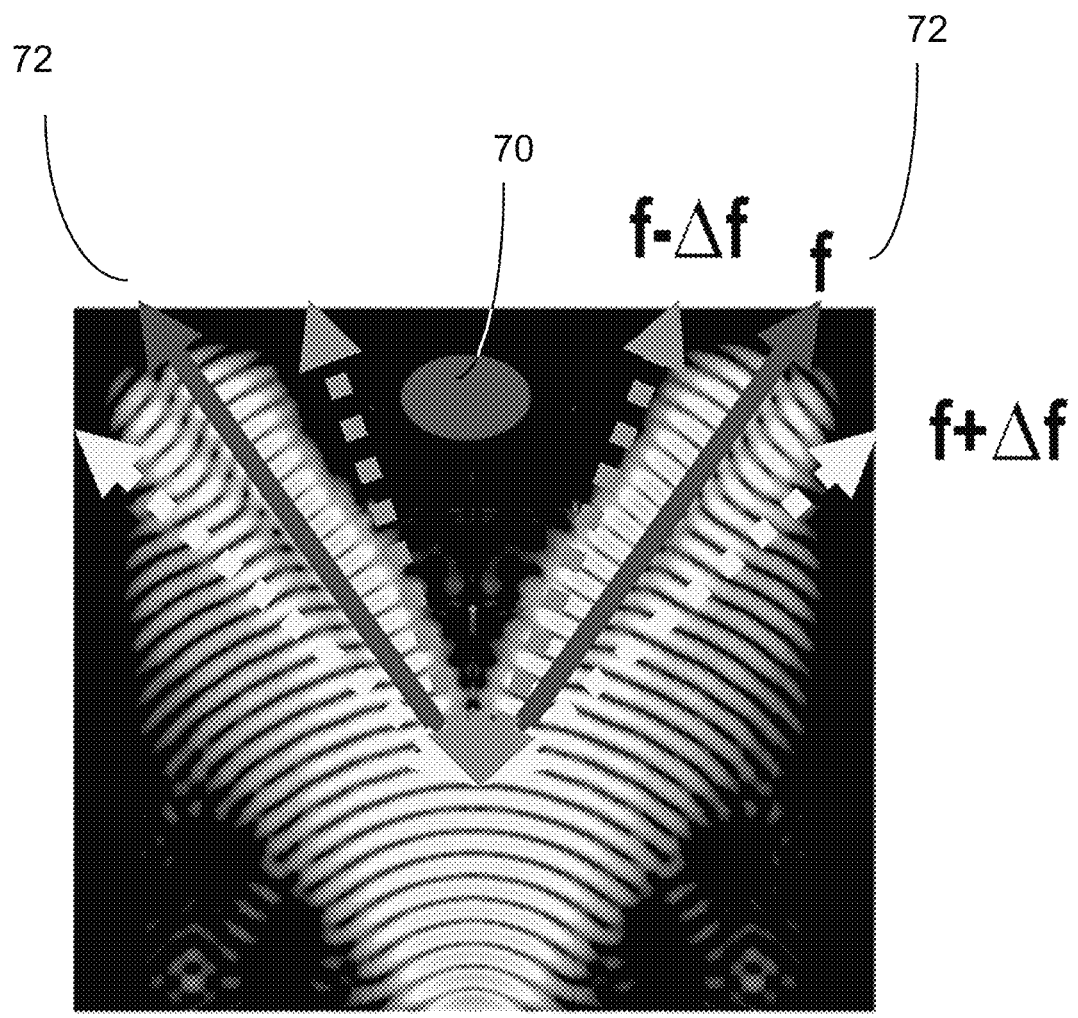
FIG. 7 shows diverting energy away from sensitive areas with a surface treatment in accordance with the present disclosure.
Figure 8:
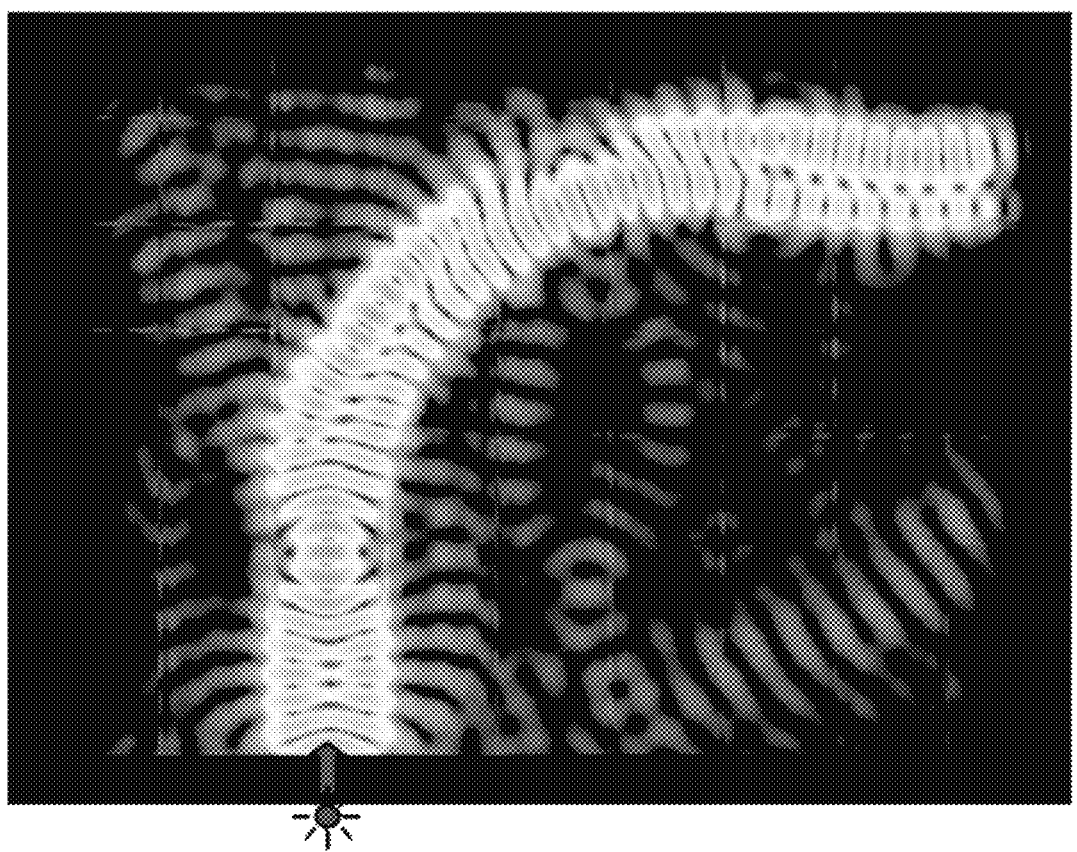
FIG. 8 shows bending energy to avoid sensitive areas in accordance with the present disclosure.
Figure 9:
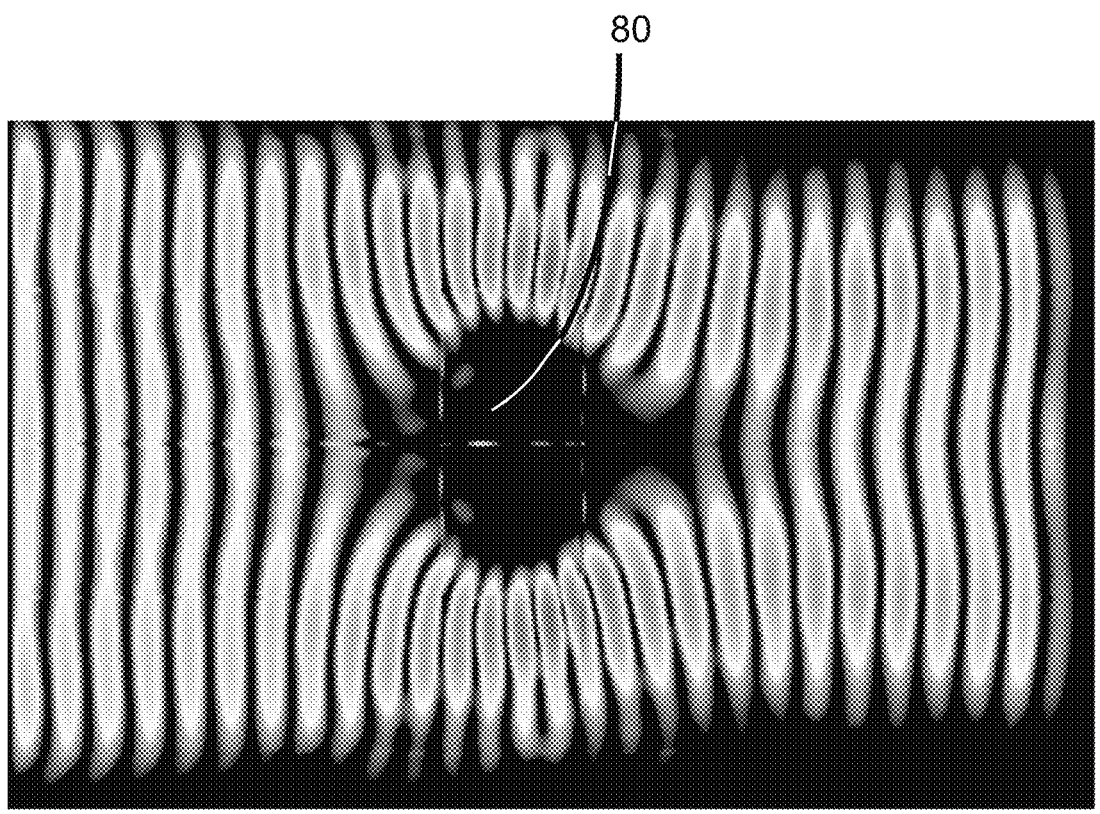
FIG. 9 shows guiding energy around a specified area in accordance with the present disclosure.
Figure 10:
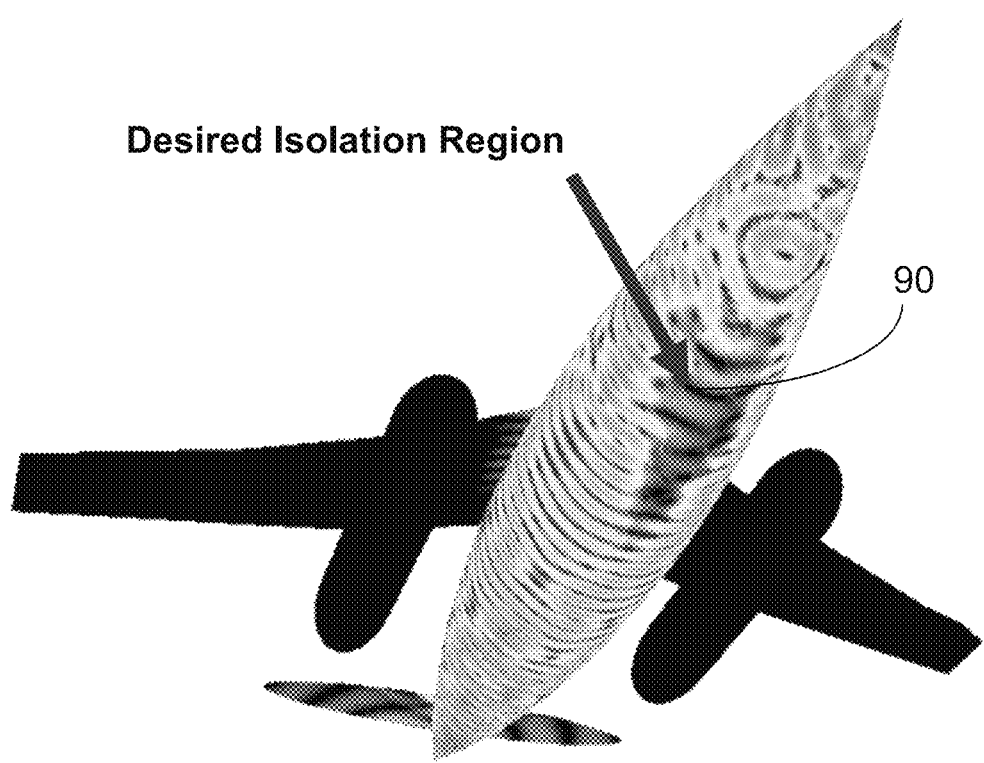
FIG. 10 shows surface currents on a fuselage with a jammer near the tail and surface treatment for re-direction from a desired isolation region in accordance with the present disclosure.

In one embodiment SW power is guided or re-directed along desired paths on a surface using either TISs or impedance surface discontinuities. Distribution of power density can also be controlled. This technique can be used to steer the phase 60 and power 62 in different directions, as shown in FIG. 6, divert the SW 72 away from an area 70, as shown in FIG. 7, bend the surface wave as shown in FIG. 8, or guide the SW around an area 80, as shown in FIG. 9, or a desired isolation region 90, as shown in FIG. 10. Rudimentary designs have been made for the examples shown in FIGS. 7 and 9, and show 26 dB and 22 dB isolation improvement, respectively. More extreme or dramatic manipulations may require higher impedance ranges and greater anisotropy.

In another embodiment the SW is re-radiated, which is attractive, because it removes the energy from the surface before it interferes with the receiver or scatters off obstacles, causing additional interference or introducing additional SW paths to the receiver 22.

Figure 12:
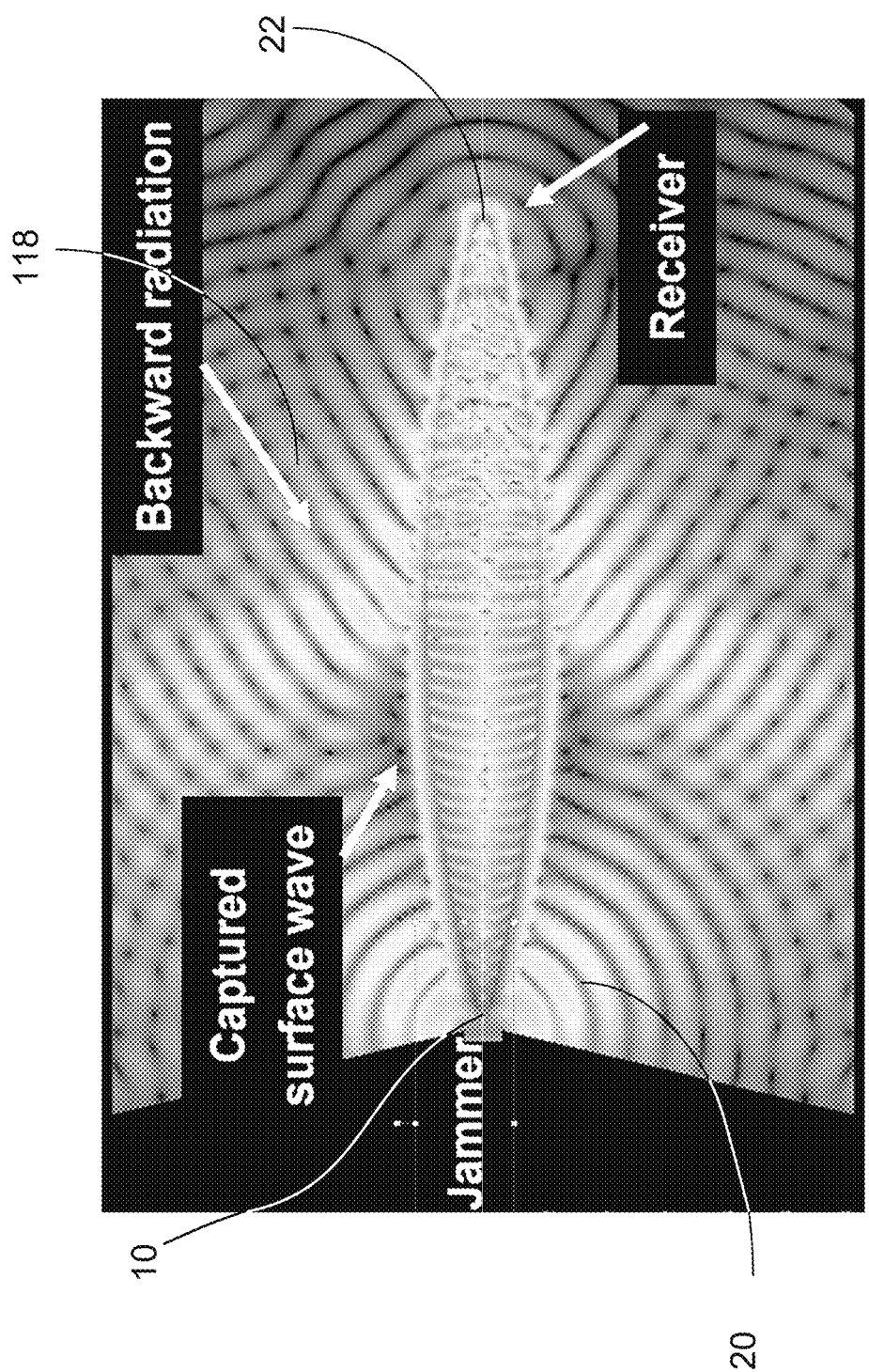
FIG. 12 shows incident energy being captured by an impedance surface and re-radiated in a backward direction in accordance with the present disclosure.

Radiation of the SW may be achieved in two ways modulation of surface impedance, as described in References 7 and 11 listed below, which are incorporated herein by reference, in order to scatter the bound SW mode, and conversion of the SW to leaky-wave radiation. Modulation of the surface impedance allows beam shaping, which can be useful for directing the radiated surface wave energy 20 in a specific direction, for example as a backward beam 118 away from the receiver 22, as shown in FIG. 12, or back towards the jammer 10. By applying the correct surface impedance variations, the energy can also be guided around the curvature of a fuselage and then re-radiated, as shown in FIG. 10, or may even be tailored to cancel some of the free-space interference at the receiver.

Figure 11:
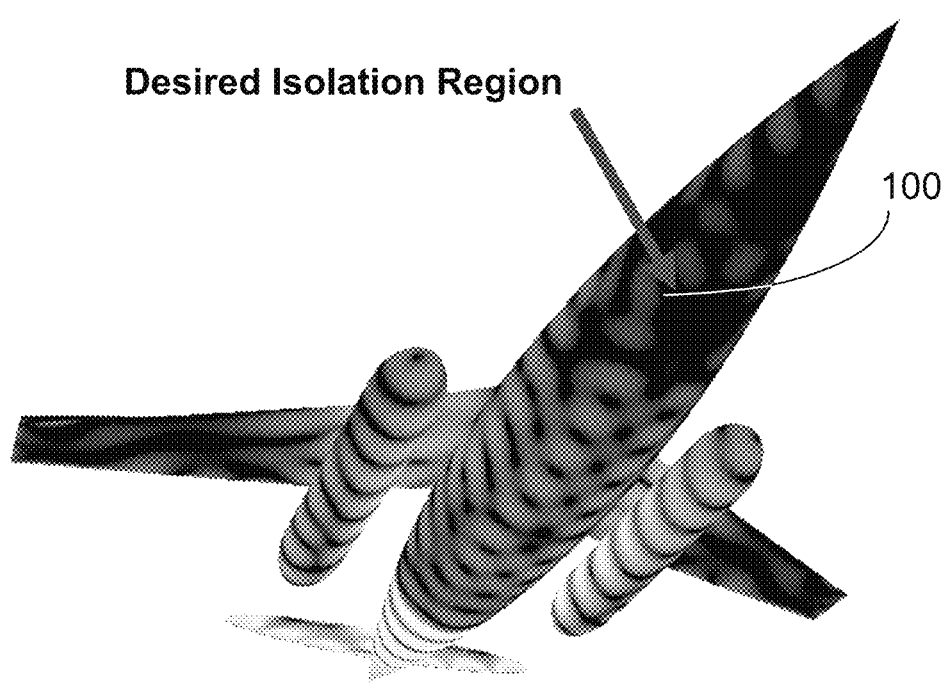
FIG. 11 shows surface currents on a fuselage with a jammer near the tail and with leaky-wave surface treatment to leak energy off the surface in accordance with the present disclosure.

The conversion of the SW to leaky-wave radiation uses a leaky wave surface treatment to leak energy off the surface more quickly. The surface treatment may be smaller, but the radiation pattern is less controllable. The example shown in FIG. 7 using this method resulted in 30 dB isolation improvement. FIG. 11 shows example surface currents on a fuselage with a jammer near the tail and with a leaky-wave surface treatment to leak energy off the surface to mitigate surface waves in a desired isolation region 100.

In another embodiment the SW is absorbed by introducing loss mechanisms into the surface treatment, which allows the SW power to be dissipated. Lossy substrates and advanced unit cell designs loaded with resistors or diodes may be used. Higher loss may be achievable at higher frequencies.

In yet another embodiment polarization conversion may be used. Tensor impedance surfaces (TISs) support hybrid TM and TE modes. This method exploits this property to change or partially convert the polarization of a SW in order to provide a greater polarization mismatch between the SW and the receiving antenna.

REFERENCES

The following references are incorporated herein by reference as though set forth in full.
1. A. Kabakian, "Tensor Impedance Surfaces" AFOSR Final Report, 2010 http://www.dtic.mil/cgi-bin/GetTRDoc?AD=ADA566251.
2. Method for characterization and implementation of artificial tensor surface impedance U.S. Pat. No. 7,911,407 issued Mar. 22, 2011.
3. Surface wave guiding apparatus and method for guiding the surface wave along an arbitrary path U.S. Pat. No. 9,246,204, issued Jan. 26, 2016.
4. J. B. Pendry et al. "Controlling Electromagnetic Fields", Science, Vol. 312, no. 5781, pp. 1780-1782, 2006.
5. A. M. Patel and A. Grbic, "Transformation electromagnetics devices using tensor impedance surfaces", IEEE International Microwave Symposium, 2013.
6. H. J. Bilow, "Guided Waves on a planar tensor impedance surface", IEEE TAP, vol. 51, no. 10, pp. 2788-2792, October 2003.
7. B, H. Fong et al. "Scalar and tensor holographic artificial impedance surfaces". IEEE TAP, vol. 58, no. 10, pp. 3212-3221, October 2010.
8, A. M. Patel and A. Grbic, "Effective Surface impedance of a printed-circuit tensor impedance surface." IEEE-MTT, vol. 61, no. 4, pp. 1403-1413, April 2013.
9, A. M. Patel and A. Grbic, "Modeling and analysis of a printed-circuit tensor impedance surface." IEEE-TAP, vol. 61, no. 1, pp 211-220, January 2013.
10. D. J. Gregoire and A. Kabakian, "Surface-wave waveguides", IEEE AWPL, vol. 10, pp 1512-1515, 2011.
11. A. M. Patel and A. Grbic, "A printed leaky-wave antenna with a sinusoidally modulated reactance surface", IEEE-TAP, vol. 59, no. 6, pp 2087-2096, June 2011.
12. A. M. Patel and A. Grbic, "Effects of Spatial dispersion on power flow along a printed-circuit tensor impedance surface" IEEE-TAP, Vol 62, no. 4, April 2014.
13. J. L. Visher et al., "Polarization Controlling holographic artificial impedance surfaces", IEEE AP-S, 2007.
14. D. F. Sievenpiper et al. "Holographic artificial impedance surfaces for conformal antennas" IEEE AP-S, 2005,
15, L. F. Canino, et al., Numerical solution of the Helmholtz equation in 2D and 3D using a high-order Nyström discretization. J. Comput. Phys., vol 146, pp. 627:663, 1998,
16. Contopanagos, H, et al., Well-conditioned boundary integral equations for three-dimensional electromagnetic scattering, IEEE TAP, vol. 50, pp. 1824-1830, December 2002.
17. Holographic artificial impedance antennas with flat lens feed structure, U.S. patent application Ser. No. 15/233,899, filed Aug. 10, 2016.
18. Lumped element tensor impedance surfaces, U.S. patent application Ser. No. 15/344,363, filed Nov. 4, 2016.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A method for providing control of surface waves propagating on a surface, the method comprising:
   providing a surface treatment on a portion of the surface; and
   configuring the surface treatment to have a tensor surface admittance distribution, wherein the tensor surface admittance distribution is determined according to a modified transformation electromagnetics (tEM) equation $$\begin{pmatrix} Yxx & Yxy \\ Yyx & Yyy \end{pmatrix}_{\pm} = -\begin{pmatrix} 1 & 0 \\ 0 & 1 \end{pmatrix} k0^2 -$$

$$\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix} k^2 \bigg) \frac{1}{\sqrt{k0^2 - k^2}} \frac{Y0^2 - Yiso^2}{2k0Y0} \pm$$

$$\left(\begin{pmatrix} -\text{Cos}[\phi+\theta] & -\text{Sin}[\phi+\theta] \\ -\text{Sin}[\phi+\theta] & \text{Cos}[\phi+\theta] \end{pmatrix} k0^2 + \right.$$

$$\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix} k^2 \text{Cos}[\theta-\phi] \bigg) \frac{1}{\sqrt{k0^2 - k^2\text{Cos}[\theta-\phi]^2}}$$

$$\frac{Y0^2 - Yiso^2}{2k0Y0}$$

where:
Θ=an angle of power flow
b=Tan [Θ]
k=a tangential wave vector
Φ=an angle of the tangential wave vector
k0=a free space wave number
Y0=an admittance of free space=1/(120*π), and
Yiso=a surface admittance of an untransformed surface; and
wherein providing the surface treatment comprises:
providing a first dielectric on the surface; and
providing a metallic pattern on a first surface of the first dielectric.

2. The method of claim 1 wherein the surface treatment comprises one or more of an isotropic, anisotropic, a homogeneous surface, or an inhomogeneous surface.

3. The method of claim 1 wherein the surface treatment comprises:
an array of unit cells, each unit cell comprising:
a dielectric; and
a metallic pattern on a first surface of the dielectric.

4. The method of claim 3 further comprising a ground plane on a second surface of the dielectric opposite the first surface.

5. The method of claim 4 wherein the at least one unit cell further comprises:
a via between the first surface of the dielectric and the ground plane.

6. The method of claim 4 wherein the at least one unit cell further comprises:
a second dielectric between the ground plane and the first dielectric;
wherein the second dielectric has a second dielectric constant that is different from a first dielectric constant of the first dielectric.

7. The method of claim 3:
wherein at least one unit cell further comprises at least one tuning element coupled to the metallic pattern, and
wherein the at least one tuning element comprises a resistor, an inductor, a capacitor, a diode, or a voltage controlled varactor.

8. The method of claim 1 wherein the surface treatment further comprises:
a ground plane on a second surface of the dielectric opposite the first surface.

9. The method of claim 8 wherein the surface treatment further comprises:
a via between the first surface of the dielectric and the ground plane.

10. The method of claim 8 wherein the surface treatment further comprises:
a second dielectric between the ground plane and the first dielectric;
wherein the second dielectric has a second dielectric constant that is different from a first dielectric constant of the first dielectric.

11. The method of claim 1 wherein the surface treatment transforms at least one of a polarization, a phase, or a power wavefront of the surface wave.

12. The method of claim 1 wherein the surface treatment comprises a property that reduces the surface wave through dissipative loss.

13. The method of claim 1 wherein the surface treatment radiates energy of the surface wave from a surface of the surface treatment.

14. The method of claim 1 wherein the surface treatment provides co-site isolation between a transmitter and a receiver.

15. The method of claim 1 wherein the surface treatment further comprises:
at least one tuning element coupled to the metallic pattern, and
wherein the at least one tuning element comprises a resistor, an inductor, a capacitor, a diode, or a voltage controlled varactor.

16. A device for providing control of surface waves propagating on a surface comprising:
a surface treatment on a portion of the surface, wherein the surface treatment is configured to have a tensor surface admittance distribution determined according to a modified transformation electromagnetics (tEM) equation $$\begin{pmatrix} Yxx & Yxy \\ Yyx & Yyy \end{pmatrix}_{\pm} = -\begin{pmatrix} 1 & 0 \\ 0 & 1 \end{pmatrix} k0^2 -$$

$$\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix} k^2 \bigg) \frac{1}{\sqrt{k0^2 - k^2}} \frac{Y0^2 - Yiso^2}{2k0Y0} \pm$$

$$\left(\begin{pmatrix} -\text{Cos}[\phi+\theta] & -\text{Sin}[\phi+\theta] \\ -\text{Sin}[\phi+\theta] & \text{Cos}[\phi+\theta] \end{pmatrix} k0^2 + \right.$$

$$\begin{pmatrix} -\text{Sin}[\phi]^2 & \text{Sin}[\phi]\text{Cos}[\phi] \\ \text{Sin}[\phi]\text{Cos}[\phi] & -\text{Cos}[\phi]^2 \end{pmatrix} k^2 \text{Cos}[\theta-\phi] \bigg) \frac{1}{\sqrt{k0^2 - k^2\text{Cos}[\theta-\phi]^2}}$$

$$\frac{Y0^2 - Yiso^2}{2k0Y0}$$

where:
Θ=an angle of power flow
b=Tan [Θ]
k=a tangential wave vector
Φ=an angle of the tangential wave vector
k0=a free space wave number
Y0=an admittance of free space=1/(120*π), and
Yiso=a surface admittance of an untransformed surface; and
wherein the surface treatment comprises:
a first dielectric on the portion of the surface; and
a metallic pattern on a first surface of the first dielectric.

17. The device of claim 16 wherein the surface treatment comprises one or more of an isotropic, anisotropic, a homogeneous surface, or an inhomogeneous surface.

18. The device of claim 16 wherein the surface treatment comprises:
an array of unit cells, each unit cell comprising:
a dielectric; and
a metallic pattern on a first surface of the dielectric.

19. The device of claim 18 further comprising a ground plane on a second surface of the dielectric opposite the first surface.

20. The device of claim 19 wherein the at least one unit cell further comprises:
a via between the first surface of the dielectric and the ground plane.

21. The device of claim 19 wherein the at least one unit cell further comprises:
a second dielectric between the ground plane and the first dielectric;
wherein the second dielectric has a second dielectric constant that is different from a first dielectric constant of the first dielectric.

22. The device of claim 18:
wherein at least one unit cell further comprises at least one tuning element coupled to the metallic pattern, and
wherein the at least one tuning element comprises a resistor, an inductor, a capacitor, a diode, or a voltage controlled varactor.

23. The device of claim 16 wherein the surface treatment further comprises:
a ground plane on a second surface of the dielectric opposite the first surface.

24. The device of claim 23 wherein the surface treatment further comprises:
a via between the first surface of the dielectric and the ground plane.

25. The device of claim 23 wherein the surface treatment further comprises:
a second dielectric between the ground plane and the first dielectric;
wherein the second dielectric has a second dielectric constant that is different from a first dielectric constant of the first dielectric.

26. The device of claim 16 wherein the surface treatment transforms at least one of a polarization, a phase, or a power wavefront of the surface wave.

27. The device of claim 16 wherein the surface treatment comprises a property that reduces the surface wave through dissipative loss.

28. The device of claim 16 wherein the surface treatment radiates energy of the surface wave from a surface of the surface treatment.

29. The device of claim 16 wherein the surface treatment provides co-site isolation between a transmitter and a receiver.

30. The device of claim 16 wherein the surface treatment further comprises:
at least one tuning element coupled to the metallic pattern, and
wherein the at least one tuning element comprises a resistor, an inductor, a capacitor, a diode, or a voltage controlled varactor.

* * * * *